United States Patent
Prelovac

(10) Patent No.: US 10,853,434 B2
(45) Date of Patent: Dec. 1, 2020

(54) USER INTERFACE FOR PRESENTING SEARCH RESULTS

(71) Applicant: Vladimir Prelovac, Palo Alto, CA (US)

(72) Inventor: Vladimir Prelovac, Palo Alto, CA (US)

(*) Notice: Subject to any disclaimer, the term of this patent is extended or adjusted under 35 U.S.C. 154(b) by 0 days.

(21) Appl. No.: 16/298,348

(22) Filed: Mar. 11, 2019

(65) Prior Publication Data

US 2020/0293591 A1    Sep. 17, 2020

(51) Int. Cl.
    *G06F 16/9538*    (2019.01)
    *G06F 16/9035*    (2019.01)
    *G06F 3/0485*    (2013.01)
    *G06F 16/957*    (2019.01)

(52) U.S. Cl.
    CPC ...... *G06F 16/9538* (2019.01); *G06F 3/04855* (2013.01); *G06F 16/9035* (2019.01); *G06F 16/9577* (2019.01)

(58) Field of Classification Search
    CPC ............ G06F 16/9538; G06F 16/9577; G06F 16/9035; G06F 3/04855; G06F 16/903; G06F 16/9038; G06F 16/838
    See application file for complete search history.

(56) References Cited

U.S. PATENT DOCUMENTS

| | | | |
|---|---|---|---|
| 6,271,840 B1 | 8/2001 | Finseth et al. | |
| 6,405,192 B1* | 6/2002 | Brown | G06F 16/954 707/722 |
| 6,847,959 B1 | 1/2005 | Arrouye et al. | |
| 8,301,656 B2 | 10/2012 | Taylor et al. | |
| 8,676,796 B2* | 3/2014 | Kulakow | G06F 16/3349 707/731 |
| 9,201,672 B1 | 12/2015 | Arana et al. | |
| 9,229,989 B1* | 1/2016 | Jain | G06F 16/951 |
| 9,552,144 B2 | 1/2017 | Negrillo et al. | |
| 2002/0078019 A1 | 6/2002 | Lawton | |

(Continued)

FOREIGN PATENT DOCUMENTS

| | | |
|---|---|---|
| WO | 2005/066844 A2 | 7/2005 |
| WO | 2014/175909 A1 | 10/2014 |

OTHER PUBLICATIONS

HTTP (HyperText Transfer Protocol) Basics. Oct. 20, 2009. [Retrieved on Sep. 2, 2019] Retrieved from the Internet:<URL: https://www.ntu.edu.sg/home/ehchua/programming/webprogramming/HTTP_Basics.html> (Year: 2009).*

(Continued)

*Primary Examiner* — James E Richardson

(57) ABSTRACT

A search interface allows the selection between multiple presentation modes, including a default mode, a dense mode, a table mode, a command line mode and a research mode. In the research mode, two scrollable regions may be displayed side-by-side. In the first scrollable region, search results may be presented. In the second scrollable region, an aggregation of content extracted from documents associated with the search results may be presented. Selection of a search result may cause the presentation of a portion of the content aggregation in the second scrollable region with the content associated with the selected search result. Scrolling of the second scrollable region allows for a seamless transition from viewing the contents from one document to the contents of the next document associated with the search results.

5 Claims, 35 Drawing Sheets

(56) References Cited

U.S. PATENT DOCUMENTS

| | | | |
|---|---|---|---|
| 2004/0054968 A1 | 3/2004 | Savage | |
| 2006/0085741 A1* | 4/2006 | Weiner | G06F 16/972 715/246 |
| 2006/0200455 A1 | 9/2006 | Wilson | |
| 2006/0277167 A1* | 12/2006 | Gross | G06F 16/9577 |
| 2006/0288001 A1* | 12/2006 | Costa | G06F 16/951 |
| 2007/0204232 A1* | 8/2007 | Ray | G06F 16/9577 715/738 |
| 2007/0276811 A1 | 11/2007 | Rosen | |
| 2008/0201304 A1 | 8/2008 | Sue | |
| 2008/0319975 A1* | 12/2008 | Morris | G06F 3/048 |
| 2009/0024605 A1* | 1/2009 | Yang | G06F 16/9535 |
| 2009/0198667 A1* | 8/2009 | Groeneveld | G06F 16/345 |
| 2010/0306213 A1* | 12/2010 | Taylor | G06F 16/9535 707/759 |
| 2012/0084346 A1* | 4/2012 | Mickens | H04L 67/02 709/203 |
| 2013/0132468 A1* | 5/2013 | Azeez | G06F 21/41 709/203 |
| 2013/0198177 A1* | 8/2013 | Oldham | G06F 3/0482 707/731 |
| 2015/0082151 A1* | 3/2015 | Liang | G06F 16/9577 715/236 |
| 2016/0132505 A1* | 5/2016 | Palmer | G06F 16/951 707/706 |
| 2016/0299905 A1* | 10/2016 | Geyer | G06F 40/134 |
| 2018/0032491 A1* | 2/2018 | Heo | G06F 16/95 |
| 2018/0365253 A1* | 12/2018 | Francis | G06F 16/94 |

OTHER PUBLICATIONS

"How to Search the Web From Terminal", SK, OSTechNix, updated Feb. 1, 2019, retrieved from: https://www.ostechnix.com/search-web-terminal/, 13 pages.

* cited by examiner

Fig. 2D

@Donna    web   ∨   🔍 orchids     Settings    Sign out

[ Exclude ] [ Ads ]    120    ☐ Research view

[ Load Speed ]

132a   132b   132c   132d

1. Orchidaceae - Wikipedia (wikipedia.org)
2. Orchid care tips and strategies that are easy to understand and put to... (aos.org)
3. Orchids at Palm Court | Downtown Cincinnati (orchidsatpalmcourt.com)
4. Orchids at Halekulani, one of the top restaurants in Honolulu (halekulani.com)
5. orchids - Hobby Growing (orchids.com)
6. How to Care for Orchids: 14 Steps (with Pictures) - wikiHow (wikihow.com)
7. Buy Orchid Hybrids & Species - OrchidWeb (orchidweb.com)
8. How to Grow Orchids, Growing Orchids, Orchid Care ... (gardena.com)
9. About Orchids: Basic Orchid Care for Beginners - Home (aboutorchids.com)
10. Orchids By Hausermann: Storefront (orchidsbyhausermann.com)
11. How to Care for Orchids | Better Homes & Gardens (bhg.com)
12. How to Grow Orchids Indoors - Make Your Best Home (thespruce.com)
13. Orchids :: Newfields (discovernewfields.org)

@Donna    Settings    Sign out

Web ▼  Q orchids  120

136a ⌒ Exclude    Ads    Load Speed    ☐ Research view
                                136b        136c en.wikipedia.org      Orchidaceae - Wikipedia Orchids are easily distinguished from other plants, as they share so...
aos.org               Orchid care tips and strategies that are easy to understand and put to... Where do I cu...
orchidsatpalmcourt.com Orchids at Palm Court | Downtown Cincinnati Experience one-of-a-kind fine dining right in...
halekulani.com        Orchids at Halekulani, one of the top restaurants in Honolulu Orchids is Halekulani's ca...
orchids.com           Orchids - Hobby Growing Orchids make a welcoming and graceful addition to your home. To...
wikihow.com           How to Care for Orchids: 14 Steps (with Pictures) - wikiHow How to Care for Orchids. O...
orchidweb.com         Buy Orchid Hybrids & Species - OrchidWeb OrchidWeb offers a wide selection of quality or...
gardeners.com         How to Grow Orchids, Growing Orchids, Orchid Care ... Caring for Orchids. With 30,000 d...
aboutorchids.com      About Orchids: Basic Orchid Care for Beginners - Home Welcome to the World of Orchid...
orchidsbyhausermann.com Orchids By Hausermann: Shorefront We are the oldest and largest orchid grower in the Mid...
bhg.com               How to Care for Orchids | Better Homes & Gardens Overwatering is a common cause for...
thespruce.com         How to Grow Orchids Indoors - Make Your Best Home To grow an orchid, you have to thi...
discovernewfields.org Orchids :: Newfields For the first time ever, Orchids will be installed in the gallery spaces at th...

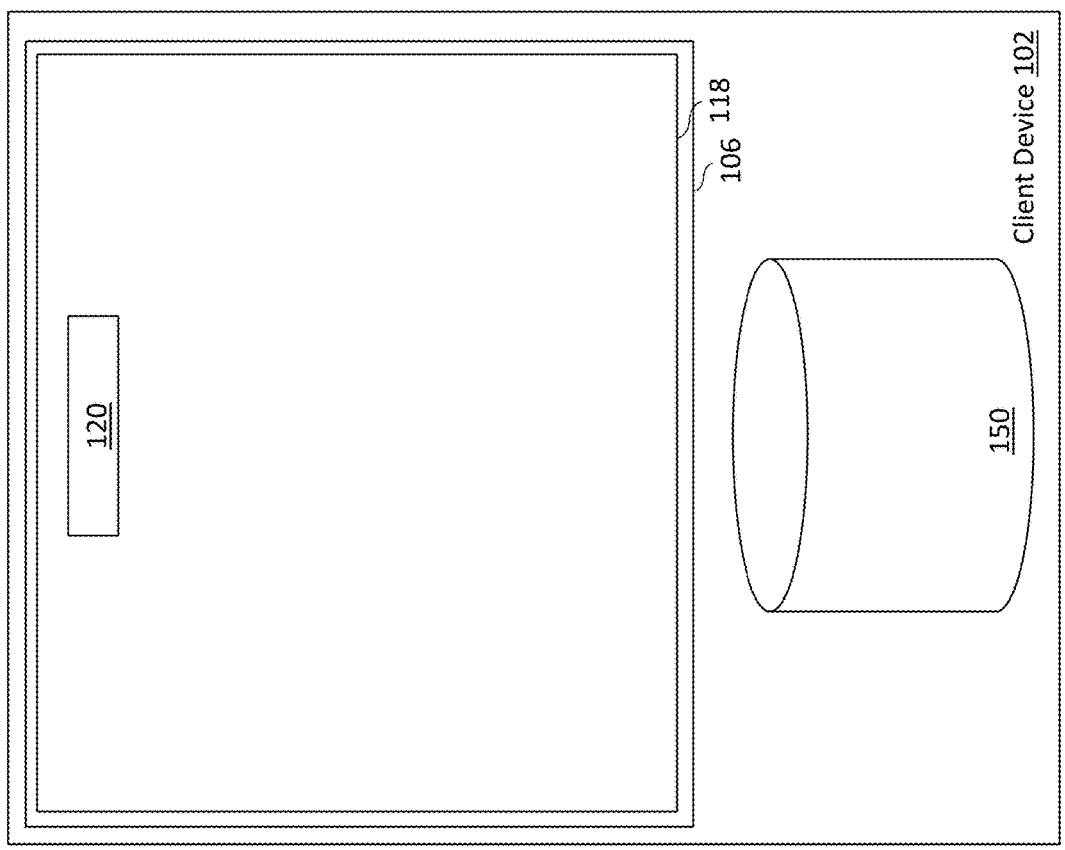

USER INTERFACE FOR PRESENTING SEARCH RESULTS

FIELD OF THE INVENTION

The present invention relates to a user interface for presenting search results, and more particularly relates to (i) a user interface with multiple selectable modes for presenting search results and/or (ii) a user interface with two scrollable regions, a first one of the scrollable regions with search results and a second one of the scrollable regions with an aggregation of content extracted from documents associated with the search results.

BACKGROUND

Internet searches are now performed routinely by individuals all around the world. Most search engines currently available offer users little ability to configure how the search results are presented, other than the number of results per page. Described herein is a search interface which provides users with many options for configuring the presentation of search results, as well as configuring the loading of search results.

SUMMARY OF THE INVENTION

In accordance with one embodiment of the invention, a search interface allows the selection between multiple presentation modes, including a default mode, a dense mode, a table mode, a command-line mode and a research mode.

In the default mode, an ordered list of search results may be presented in response to a search query. Each of the search results may include a descriptive link (e.g., a hyperlink with descriptive text as anchor text), a uniform resource location (URL) link (e.g., a hyperlink with a URL as anchor text), a content snippet, and an alternative rank. The descriptive link and the URL link may be linked to a document associated with the respective search result.

In the dense mode, an ordered list of search results may be presented in response to a search query. Each of the search results may include a ranking, a descriptive link, a domain name and an alternative rank. The descriptive link may be linked to a document associated with the respective search result.

In the table mode, an ordered list of search results may be presented in response to a search query. Each of the search results may include a domain name, a descriptive link and a content snippet. The descriptive link may be linked to a document associated with the respective search result. The domain names may be arranged in a first column, and the descriptive links with the content snippets may be arranged in a second column.

In a command-line mode, an ordered list of search results may be presented in response to a search query being received in a command line. Each of the search results may include a descriptive link and a domain name. The descriptive link may be linked to a document associated with the respective search result.

In the research mode, two scrollable regions may be displayed in a side-by-side manner. In the first scrollable region, search results may be presented. In the second scrollable region, an aggregation of content extracted from documents associated with the search results may be presented. Selection of a search result may cause the presentation of a portion of the content aggregation in the second scrollable region with the content associated with the selected search result. Scrolling of the second scrollable region allows for a seamless transition from viewing the contents from one document to the contents of the next document associated with the search results.

These and other embodiments of the invention are more fully described in association with the drawings below.

BRIEF DESCRIPTION OF THE DRAWINGS

FIG. 2D depicts, for the first presentation mode, a screenshot of a window with an arrangement of search results that is displayed in response to a user submitting a search query, in accordance with one embodiment of the present invention.

FIG. 3D depicts, for the second presentation mode, a screenshot of a window with an arrangement of search results displayed in response to a user submitting a search query, in accordance with one embodiment of the present invention.

FIG. 4D depicts, for the third presentation mode, a screenshot of a window with an arrangement of search results that is displayed in response to a user submitting a search query, in accordance with one embodiment of the present invention.

FIG. 5D depicts, for the fourth presentation mode, a screenshot of a window with an arrangement of search results that is displayed in response to a user submitting a search query in a command line, in accordance with one embodiment of the present invention.

FIG. 6A depicts, for a fifth presentation mode, a window with a text box that accepts a query, in accordance with one embodiment of the present invention.

FIG. 6D depicts, for the fifth presentation mode, a screenshot of a window with an arrangement of search results that is displayed in response to a user submitting a search query, in accordance with one embodiment of the present invention.

FIG. 6J depicts, for the fifth presentation mode, a screenshot of a window with an arrangement of search results that is displayed in response to a user scrolling further down through the aggregation of content displayed in the second scrollable region of the window of FIG. 6I, in accordance with one embodiment of the present invention.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention. Descriptions associated with any one of the figures may be applied to different figures containing like or similar components/steps.

Figure 1:
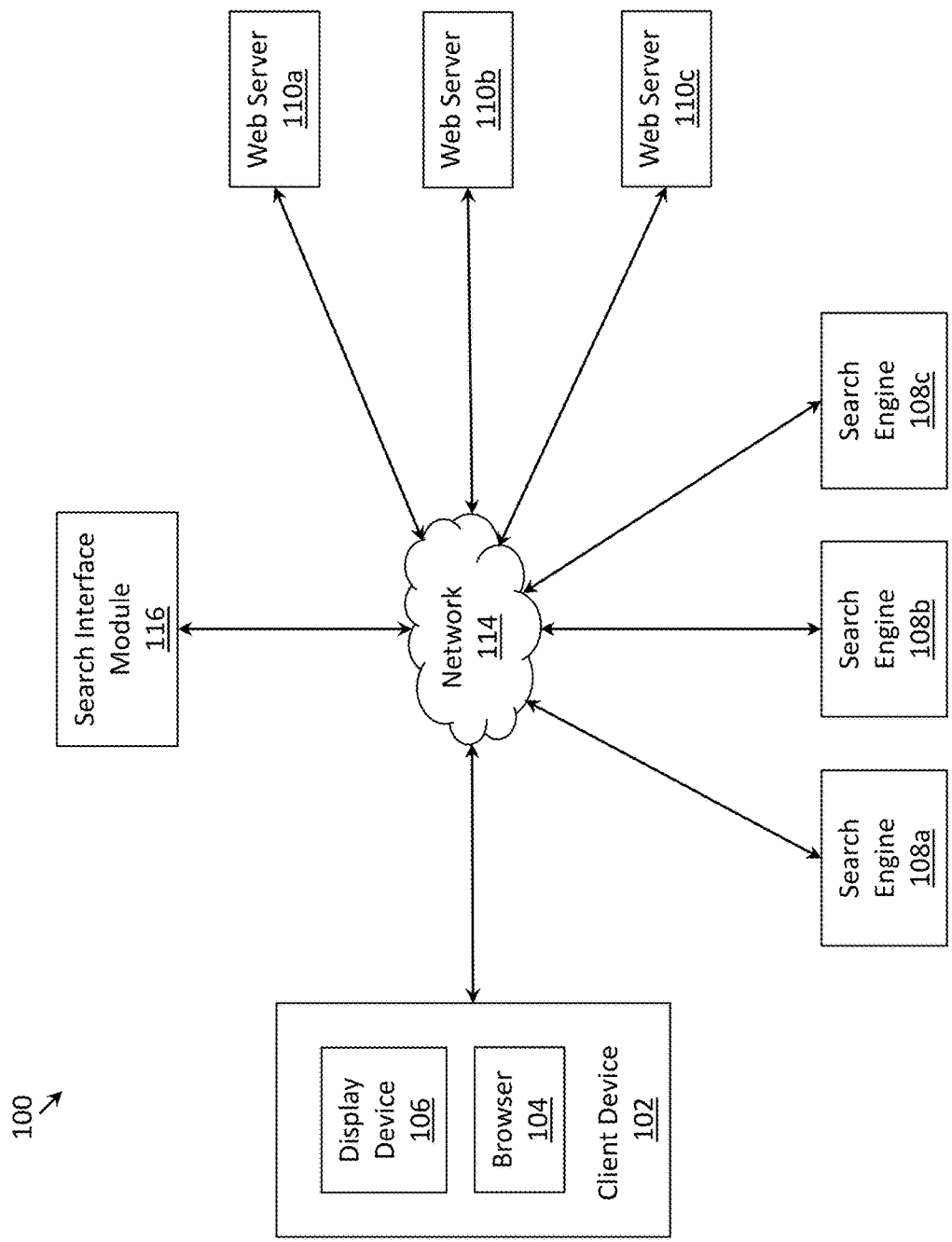
FIG. 1 depicts a block diagram of a system in which a client device may access search results through a search interface module, in accordance with one embodiment of the present invention.

FIG. 1 depicts a block diagram of system 100 in which client device 102 may access search results through search interface module 116. Client device 102 may include browser 104 (also called a web browser) configured to access information on the World Wide Web. Example browsers include Chrome® from Google LLC® of Mountain View, Calif.; Firefox® from the Mozilla Corp® of Mountain View, Calif.; Safari® from Apple Inc. of Cupertino, Calif.; and Internet Explorer® from Microsoft, Corporation of Redmond, Wash. Browser 104 may be used to retrieve and display an interface provided by search interface module 116. Such an interface, described in detail below, may be used to receive a search query from a user and present search results to a user.

In order to determine the search results, search interface module 116 may communicate with one or more of search engines 108a-108c. Three search engines are depicted in the embodiment of FIG. 1, but any number of search engines may be present in other embodiments. Example search engines include Google® from Google, LLC® of Mountain View, Calif.; Bing® from Microsoft, Corporation® of Redmond, Wash.; Yandex® from Yandex N.V.® of Moscow, Russia; and Gigablast® from Gigablast, Inc.® of Albuquerque, N. Mex. Search interface module 116 may submit the search query to one or more of search engines 108a-108c and aggregate the search results returned by the one or more search engines into one ordered list of search results. One aggregation method involves weighting the rankings of search results returned by each of the search engines before combining (e.g., summing) the weighted rankings into a single ranking.

After the search results are presented by browser 104 on display device 106 to a user, the user may select one or more of the search results. In response, browser 104 may retrieve one or more documents (e.g., a webpage, an image, a video or other collection of information) corresponding to the one or more selected search results from one or more of web servers 110a-110c. Three web servers are depicted in the embodiment of FIG. 1, but any number of web servers may be present in other embodiments. Example web servers include ITS® from Microsoft, Corporation® of Redmond, Wash.; and Apache HTTP Server® (also called Apache®) from The Apache Software Foundation® of Forest Hill, Md.

Various components of FIG. 1 (e.g., client device 102, search engines 108a-108c, web servers 110a-110c, search interface module 116) may be communicatively coupled to one another by network 114. Network 114 may be any form of communications means and, in some cases, may be individual communications links, or one or more communications networks, including private networks, public networks and/or virtual private networks over public networks.

In the description that follows, five presentation modes of search interface module 116 are described, as well as a user interface that can be used to select one of the presentation modes and switch from one of the presentation modes to another. The presentation modes include a "default" (or first) mode described in FIGS. 2A-2D, a "dense" (or second) mode described in FIGS. 3A-3D, a "table" (or third) mode described in FIGS. 4A-4D, a "hacker" (or fourth) mode described in FIGS. 5A-5D, and a "research" (or fifth) mode described in FIGS. 6A-6J. Such descriptive names associated with each of the presentation modes are for ease of description, and certainly other names may be used. For example, the fourth mode may also be called a "command line" mode.

Figure 2A:
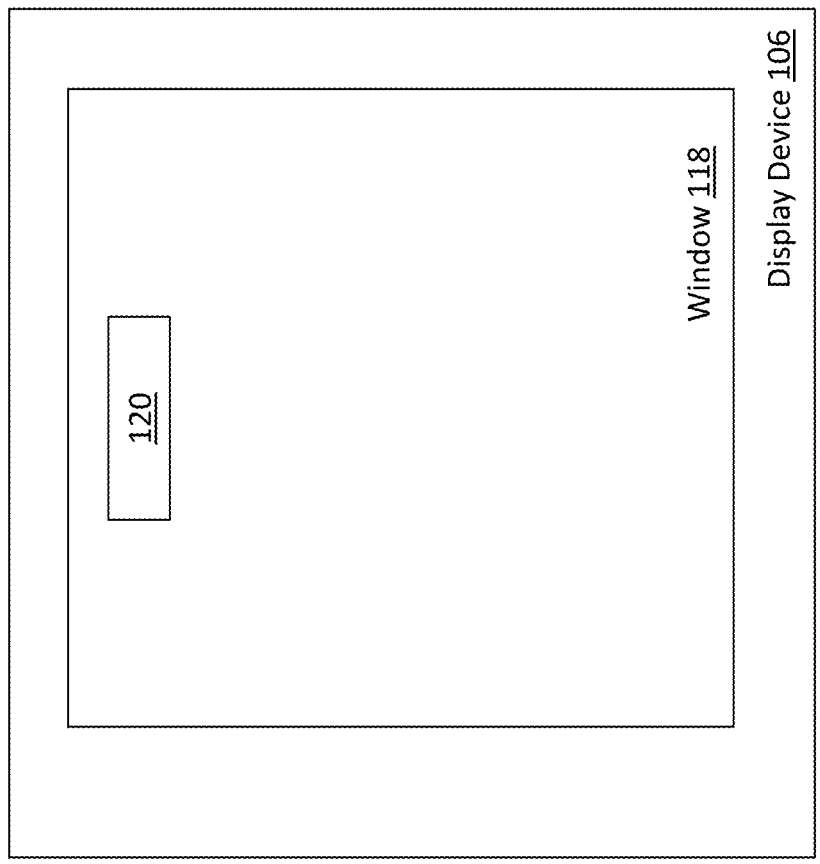
FIG. 2A depicts, for a first presentation mode, a window (i.e., window of a user interface) with a text box that accepts a search query, in accordance with one embodiment of the present invention.

FIG. 2A depicts window 118 that may be displayed during the first presentation mode. Window 118 may include text box 120 that accepts a search query (e.g., one or more keywords, optionally separated from one another by Boolean operators such as AND, OR, etc.). While not depicted in FIG. 2A for simplicity of illustration, it is understood that text may be shown in window 118 that instructs a user to enter one or more search terms into text box 120. Once the search query is submitted by the user (e.g., by pressing the enter or return key on a keyboard, clicking a submit icon in the user interface), search results may be retrieved and returned by search interface module 116. It is also possible for the search query to be received via a microphone of client device 102 (which captures a spoken version of the search query), and then transcribed using speech recognition software at client device 102 (or at another network-connected device) into a textual version of the search query.

Figure 2B:
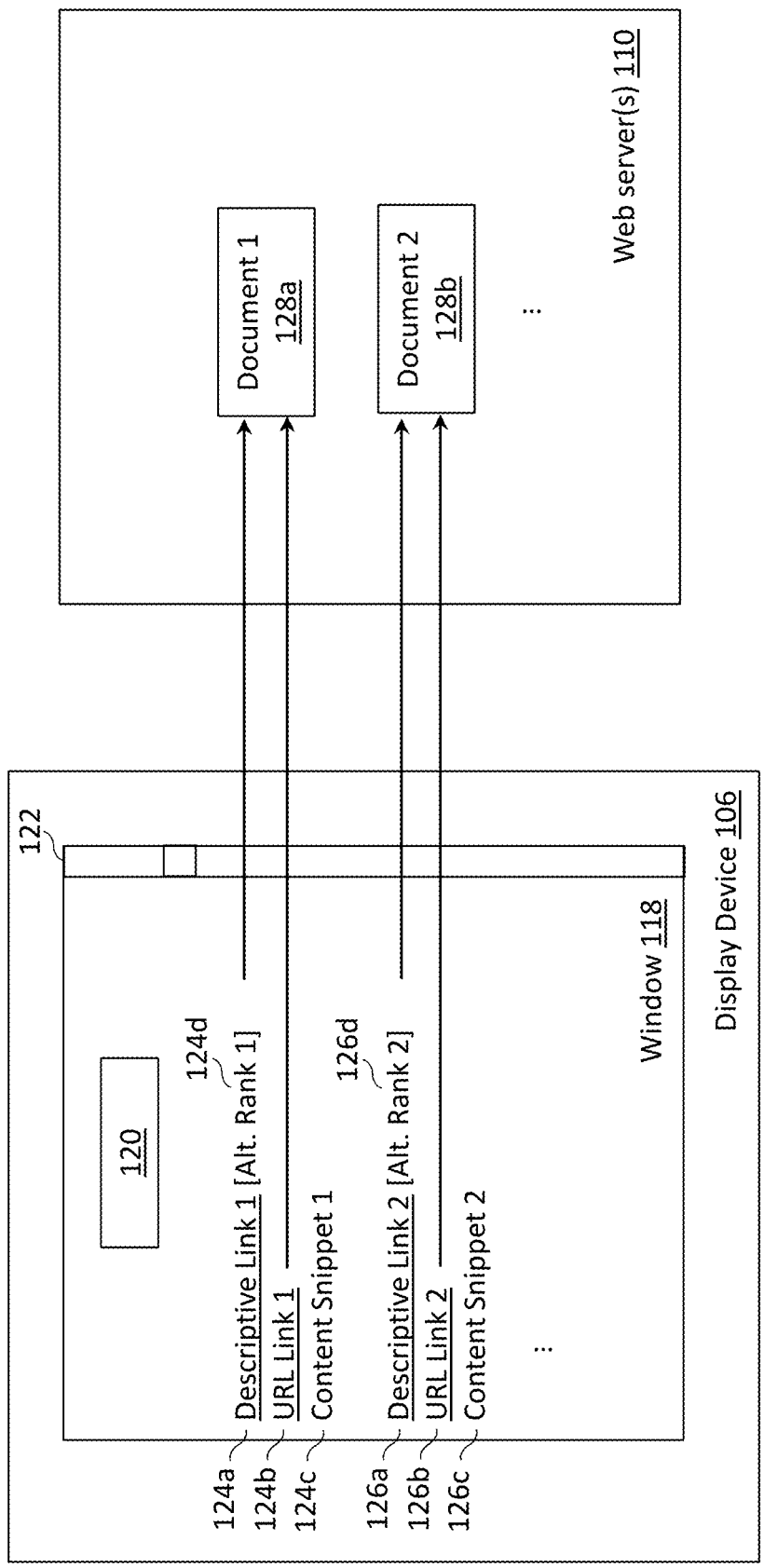
FIG. 2B depicts, for the first presentation mode, a window with an arrangement of search results that is displayed in response to a user submitting a search query, in accordance with one embodiment of the present invention.

FIG. 2B depicts window 118 with an ordered list of search results that may be displayed during the first presentation mode. The ordered list of search results may not be explicitly numbered, but it is understood that the top-most search result has a ranking of "1", the search result immediately below the top-most search result has a ranking of "2" and so on. As described above, the ordering of the search results may be assigned by search interface module 116 and may be based on a weighted combination of the rankings assigned to the search results by one or more of search engines 108a-108c.

Each of the search results may include a descriptive link, a URL link, a content snippet, and an alternative rank. The descriptive link may include a hyperlink that is linked to a document that is deemed relevant to the search query. The anchor text of the descriptive link may include the title of (or other key word(s) that describe) the document that is linked from the descriptive link. The URL link may include a hyperlink that is linked to the same document that is linked from the descriptive link. The anchor text of the URL link may include the URL at which the document may be accessed. The content snippet may include a string of consecutive words (e.g., a sentence, a few sentences) that are copied or extracted from the document. It is noted that the anchor text of the descriptive link may provide the user with a high-level description of the linked document, whereas the content snippet may provide the user with a more detailed description of the linked document. Lastly, an alternative rank may include a rank assigned to the search result by one of search engines 108a-108c. In other words, this "alternative rank" may be alternative to the ranking assigned by search interface module 116.

In the example of FIG. 2B, two search results are depicted. The first search result may include descriptive link 1 (124a), URL Link 1 (124b), content snippet 1 (124c), and alternative rank 1 (124d). Descriptive link 1 (124a) and URL link 1 (124b) may be linked to document 1 (128a) that is stored at web server(s) 110. The second search result may include descriptive link 2 (126a), URL Link 2 (126b), content snippet 2 (126c), and alternative rank 2 (126d). Descriptive link 2 (126a) and URL link 2 (126b) may be linked to document 2 (128b) that is stored at web server(s) 110. Window 118 may include scroll bar 122, allowing the contents of window 118 to be scrolled up or down, in the event that there are more search results than can be displayed in window 118 at a single time.

Figure 2C:
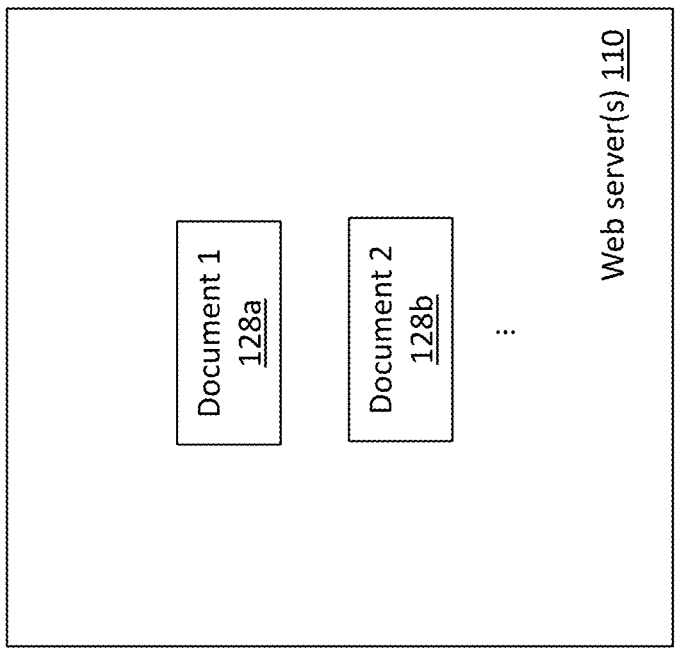
FIG. 2C depicts, for the first presentation mode, a window with a document returned in response to a user selecting one of the search results, in accordance with one embodiment of the present invention.
Figure 2C:
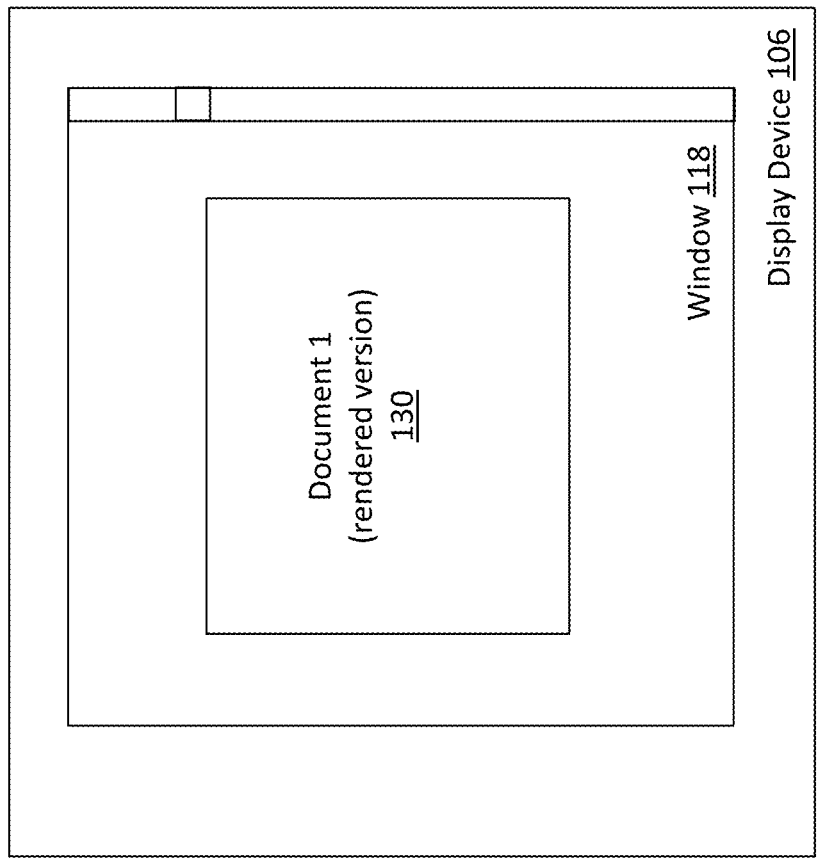

In response to a user selecting either descriptive link 1 (124a) or URL link 1 (124b), document 1 (130) may be displayed in window 118, as shown in FIG. 2C. More precisely, document 1 (128a) may be received by client device 102 and rendered into document 1 (130) by browser 104. For simplicity, document 1 (128a) is drawn as a single container of data, but it is understood that, in general, the content of document 1 (images, advertisements, text, etc.) may be stored on one or more servers (i.e., in a distributed fashion).

Figure 2D:
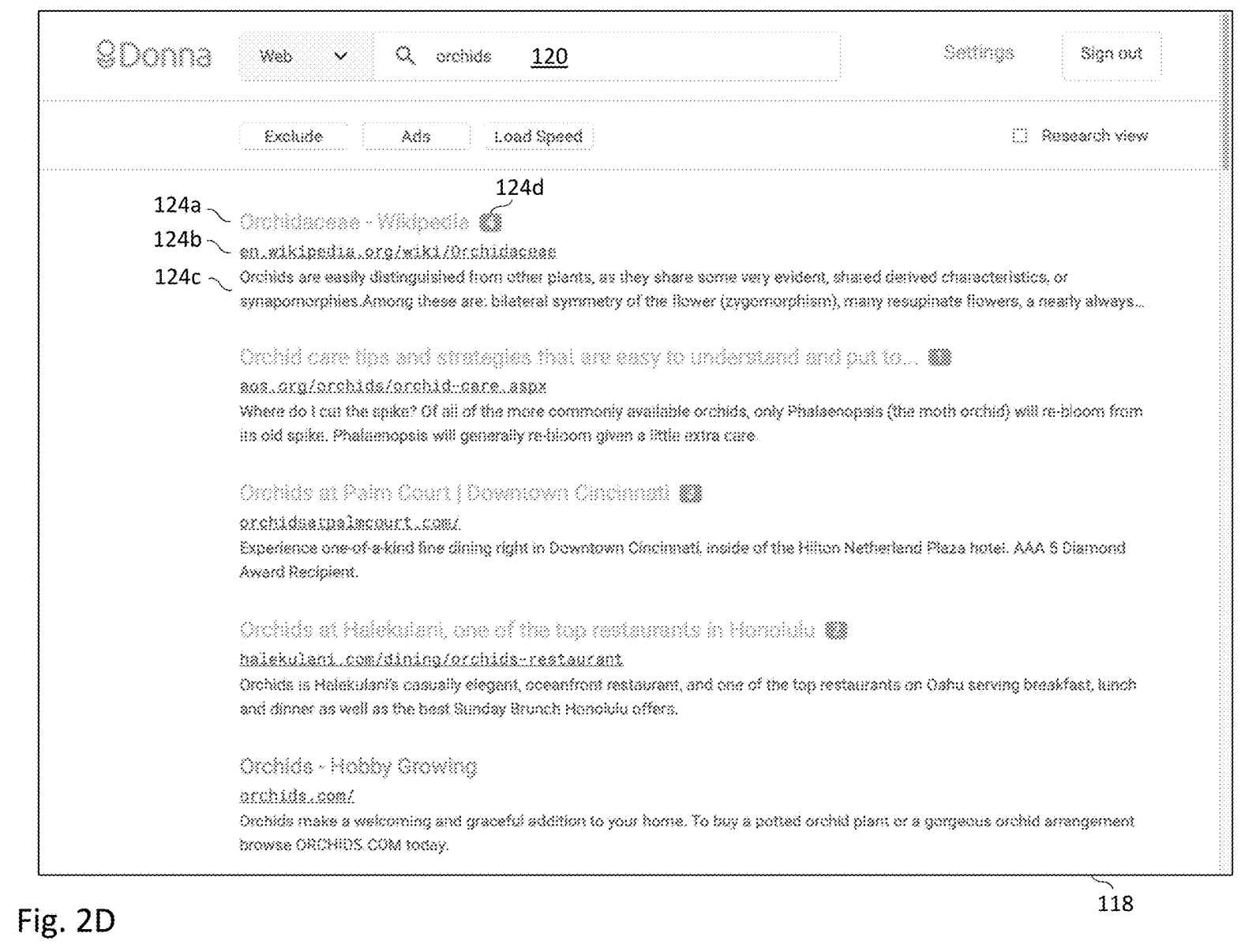

FIG. 2D depicts, for the first presentation mode, a screenshot of window 118 with an arrangement of search results that was displayed in response to the search query "orchids". The first search result includes the descriptive link "Orchidaceae—Wikipedia" (124a), the URL link "en.wikipedia.org/wiki/Orchidaceae" (124b), the content snippet "Orchids are easily distinguished from other plants, as they share some very evident, shared derived characteristics, or synapomorphies. Among these are: bilateral symmetry of the flower (zygomorphism), many resupinate flowers, a nearly always . . . " (124c), and alternative rank "4" (124d). In other words, the first search result (i.e., ranked as the most relevant search result by search interface module 116) was ranked as the fourth most relevant search result by a search engine (e.g., search engine 108a). It is noted that some of the search results may not have any alternative rank, such as the fifth search result. For instance, the fifth search result may not have been returned by search engine 108a, and hence no ranking may have been assigned to the fifth search result by search engine 108a.

Figure 3A:
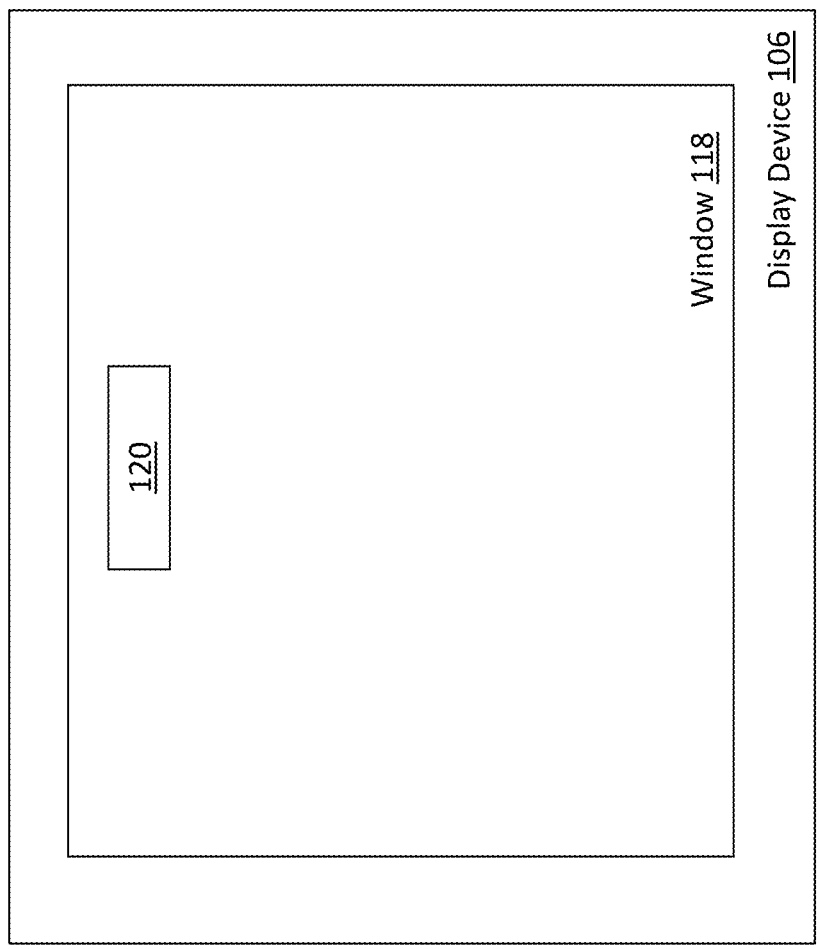
FIG. 3A depicts, for a second presentation mode, a window with a text box that accepts a query, in accordance with one embodiment of the present invention.

FIG. 3A depicts window 118 that may be displayed during the second presentation mode. Window 118 may include text box 120 that accepts a search query. While not depicted in FIG. 3A for simplicity of illustration, it is understood that text may be shown in window 118 that instructs a user to enter one or more search terms into text box 120. Once the search query is submitted by the user (e.g., by pressing the enter or return key on a keyboard, clicking a submit icon in the user interface), search results may be retrieved and returned by search interface module 116. Similar to the first presentation mode, it is also possible for the search query to be received via a microphone of client device 102 (which captures a spoken version of the search query), and then transcribed using speech recognition software at client device 102 (or at another network-connected device) into a textual version of the search query.

Figure 3B:
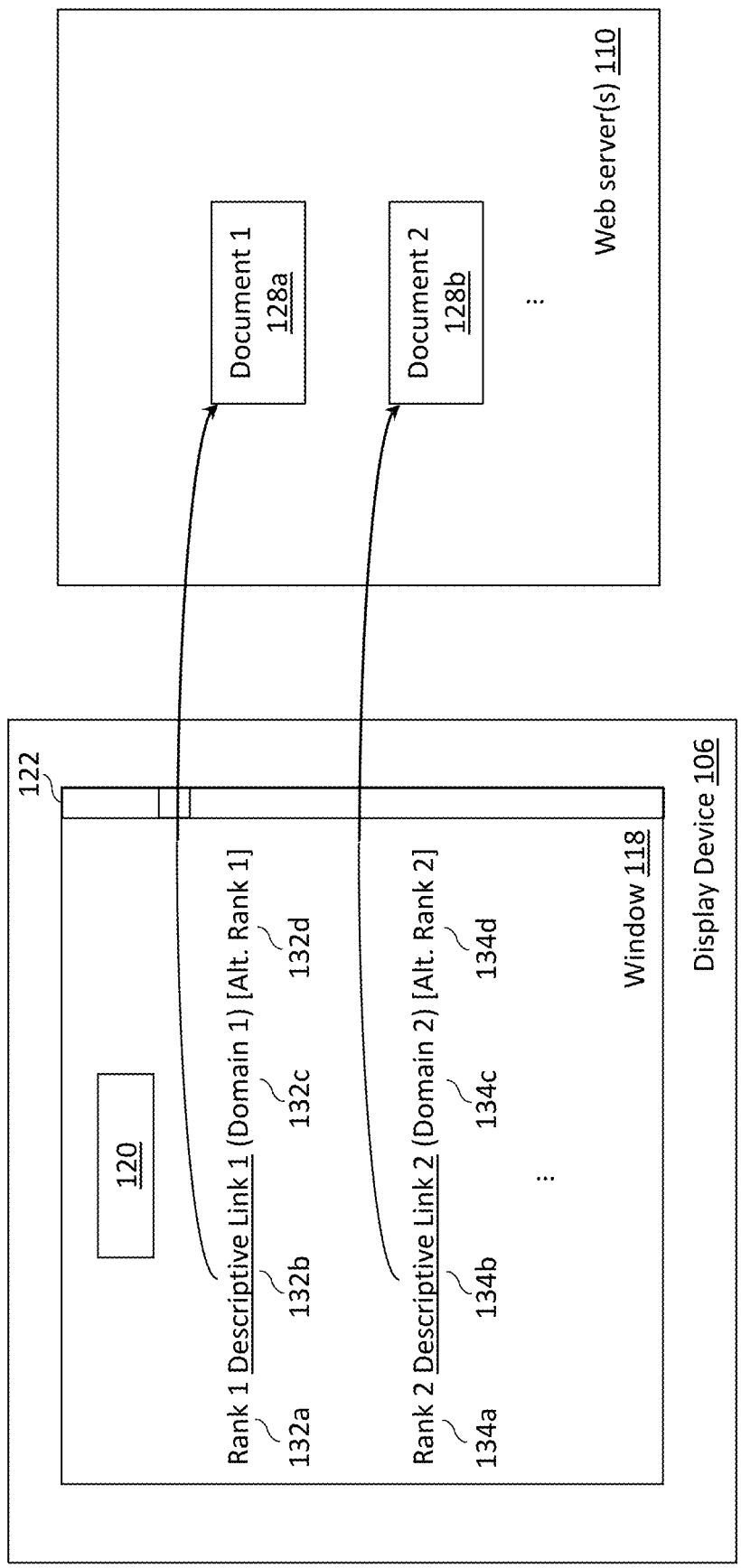
FIG. 3B depicts, for the second presentation mode, a window with an arrangement of search results that is displayed in response to a user submitting a search query, in accordance with one embodiment of the present invention.

FIG. 3B depicts window 118 with an ordered list of search results that may be displayed during the second presentation mode. The ordered list of search results may be consecutively numbered 1, 2, 3, etc. As described above, the ordering of the search results may be assigned by search interface module 116 and may be based on a weighted combination of the rankings assigned to the search results by one or more of search engines 108*a*-108*c*.

Each of the search results may be displayed in a single line of window 118, and may include a rank, a descriptive link, a domain name and an alternative rank. A descriptive link may include a hyperlink that is linked to a document that is deemed relevant to the search query. The anchor text of the descriptive link may include the title of (or other key word(s) that describe) the document that is linked from the descriptive link. The domain name may be that from which the document is accessible. Lastly, an alternative rank may include a rank assigned to the search result by one of search engines 108*a*-108*c*.

In the example of FIG. 3B, two search results are depicted. The first search result may include rank 1 (132*a*), descriptive link 1 (132*b*), domain 1 (132*c*), and alternative rank 1 (132*d*). Descriptive link 1 (132*b*) may be linked to document 1 (128*a*) that is stored at web server(s) 110. The second search result may include rank 2 (134*a*), descriptive link 2 (134*b*), domain 2 (134*c*), and alternative rank 2 (134*d*). Descriptive link 2 (134*b*) may be linked to document 2 (128*b*) that is stored at web server(s) 110. Window 118 may include scroll bar 122, allowing the contents of window 118 to be scrolled up or down, in the event that there are more search results than can be displayed in window 118 at a single time.

Figure 3C:
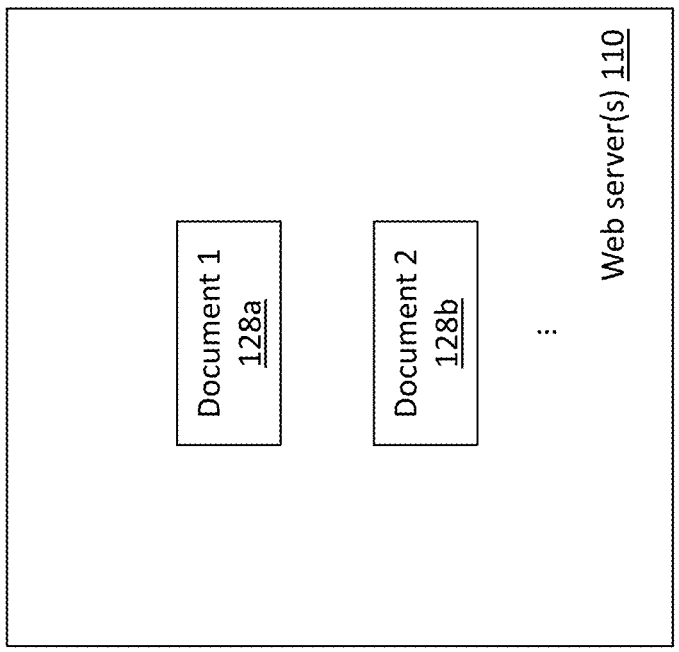
FIG. 3C depicts, for the second presentation mode, a window with a document returned in response to a user selecting one of the search results, in accordance with one embodiment of the present invention.
Figure 3C:
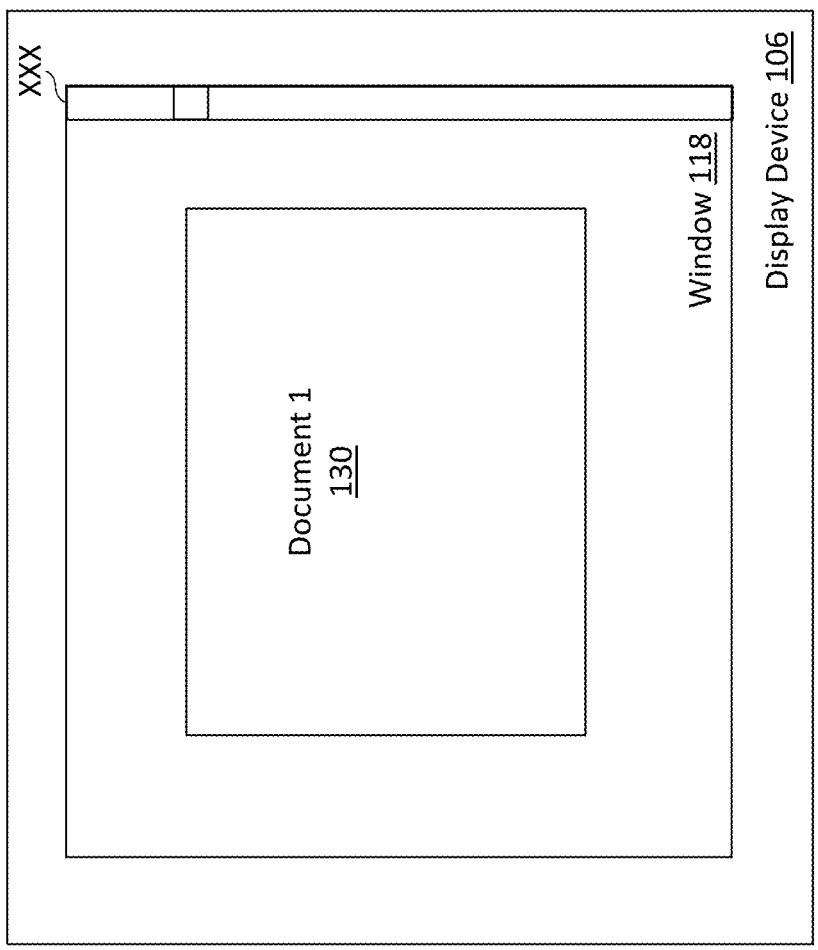

In response to a user selecting descriptive link 1 (132*b*), document 1 (130) may be displayed in window 118, as shown in FIG. 3C. More precisely, document 1 (128*a*) may be received by client device 102 and rendered into document 1 (130) by browser 104.

FIG. 3D depicts, for the second presentation mode, a screenshot of window 118 with an arrangement of search results that was displayed in response to the search query "orchids". The first search result includes the ranking of "1" (132*a*), the descriptive link "Orchidaceae—Wikipedia" (132*b*), the domain name "wikipedia.org" (132*c*), and alternative rank "4" (132*d*). It is noted that some of the search results may not have any alternative rank, such as the fifth, sixth, ninth, tenth, and twelfth search results. In comparison to the "default" mode depicted in FIG. 2D with five search results, it is noted that the "dense" mode depicted in FIG. 3D includes thirteen search results, which is more than double the number of search results of the default mode.

Figure 4A:
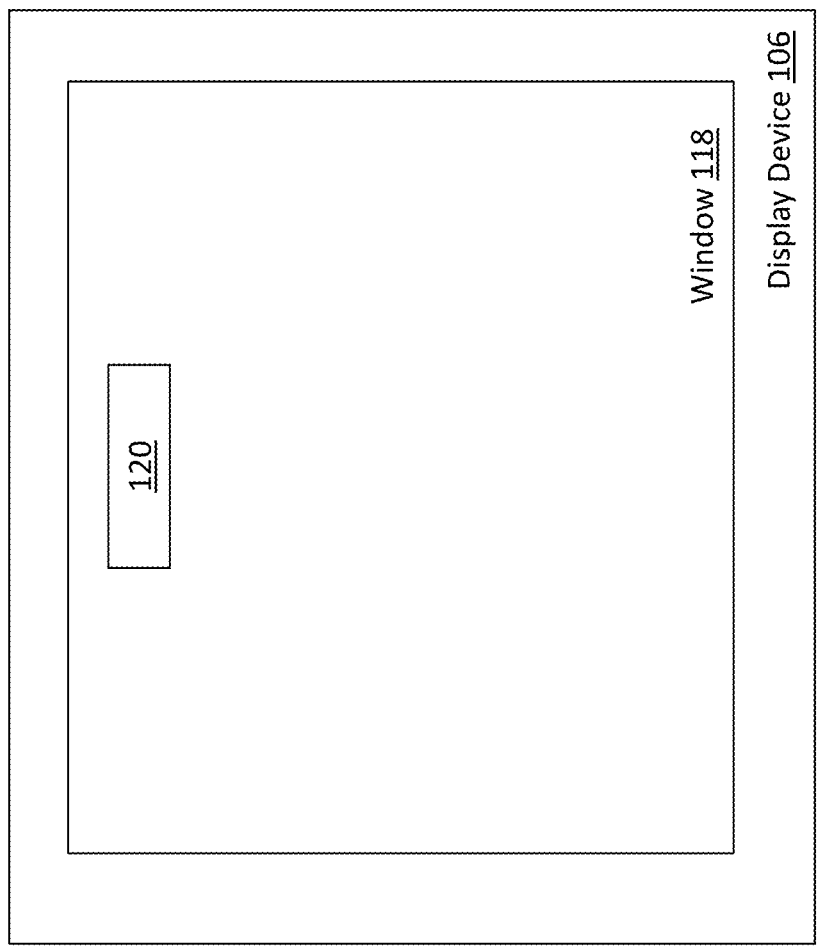
FIG. 4A depicts, for a third presentation mode, a window with a text box that accepts a query, in accordance with one embodiment of the present invention.

FIG. 4A depicts window 118 that may be displayed during the third presentation mode. Window 118 may include text box 120 that accepts a search query. While not depicted in FIG. 4A for simplicity of illustration, it is understood that text may be shown in window 118 that instructs a user to enter one or more search terms into text box 120. Once the search query is submitted by the user (e.g., by pressing the enter or return key on a keyboard, clicking a submit icon in the user interface), search results may be retrieved and returned by search interface module 116. Similar to the first presentation mode, it is also possible for the search query to be received via a microphone of client device 102 (which captures a spoken version of the search query), and then transcribed using speech recognition software at client device 102 (or at another network-connected device) into a textual version of the search query.

Figure 4B:
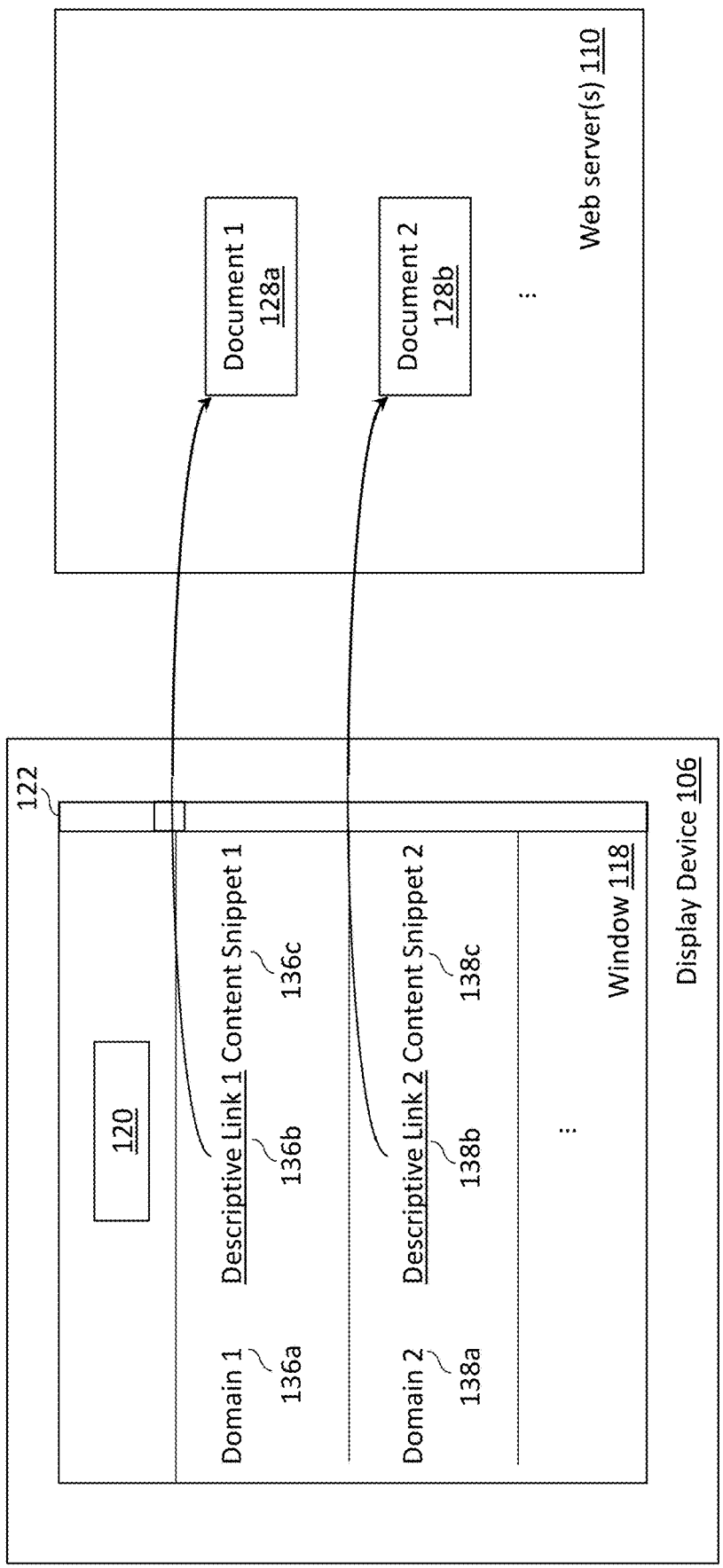
FIG. 4B depicts, for the third presentation mode, a window with an arrangement of search results that is displayed in response to a user submitting a search query, in accordance with one embodiment of the present invention.

FIG. 4B depicts window 118 with an ordered list of search results that may be displayed during the third presentation mode. The ordered list of search results may not be explicitly numbered, but it is understood that the top-most search result has a ranking of "1", the search result immediately below the top-most search result has a ranking of "2" and so on. As described above, the ordering of the search results may be assigned by search interface module 116 and may be based on a weighted combination of the rankings assigned to the search results by one or more of search engines 108*a*-108*c*.

Each of the search results may be displayed in a single line of window 118, and may include a domain name, a descriptive link and a content snippet. The descriptive link may include a hyperlink that is linked to a document that is deemed relevant to the search query. The anchor text of the descriptive link may include the title of (or other key word(s) that describe) the document that is linked from the descriptive link. The domain name may be that from which the document is accessible. The content snippet may include a string of consecutive words (e.g., a sentence, a few sentences) that are copied or extracted from the document.

In the third presentation mode, a horizontal line may separate each of the search results from one another. Further, for each of the search results, the domain name may be spaced apart from the descriptive link and the content snippet, such that the domain names are arranged in a first column of window 118, and the descriptive links along with the content snippets are arranged a second column of window 118.

In the example of FIG. 4B, two search results are depicted. The first search result may include domain 1 (136*a*), descriptive link 1 (136*b*) and content snippet 1 (136*c*). Descriptive link 1 (136*b*) may be linked to document 1 (128*a*) that is stored at web server(s) 110. The second search result may include domain 2 (138*a*), descriptive link 2 (138*b*) and content snippet 2 (138*c*). Descriptive link 2 (138*b*) may be linked to document 2 (128*b*) that is stored at web server(s) 110. Window 118 may include scroll bar 122, allowing the contents of window 118 to be scrolled up or down, in the event that there are more search results than can be displayed in window 118 at a single time.

Figure 4C:
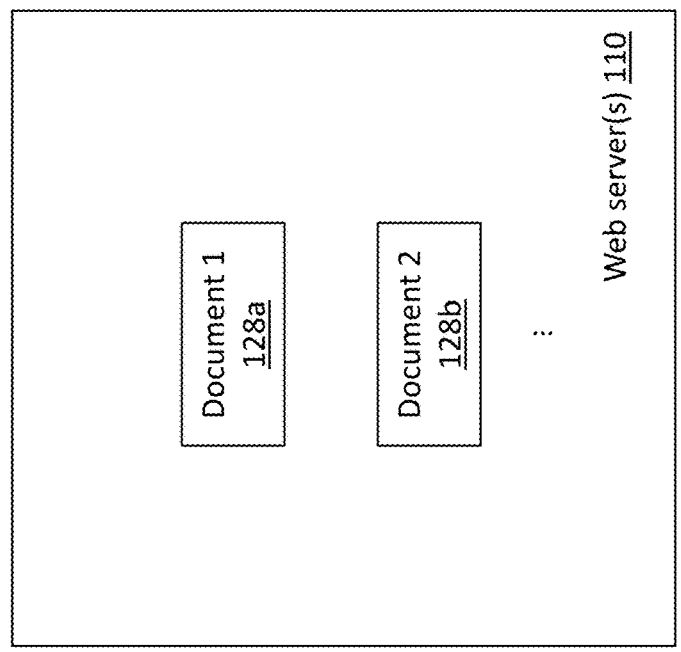
FIG. 4C depicts, for the third presentation mode, a window with a document returned in response to a user selecting one of the search results, in accordance with one embodiment of the present invention.
Figure 4C:
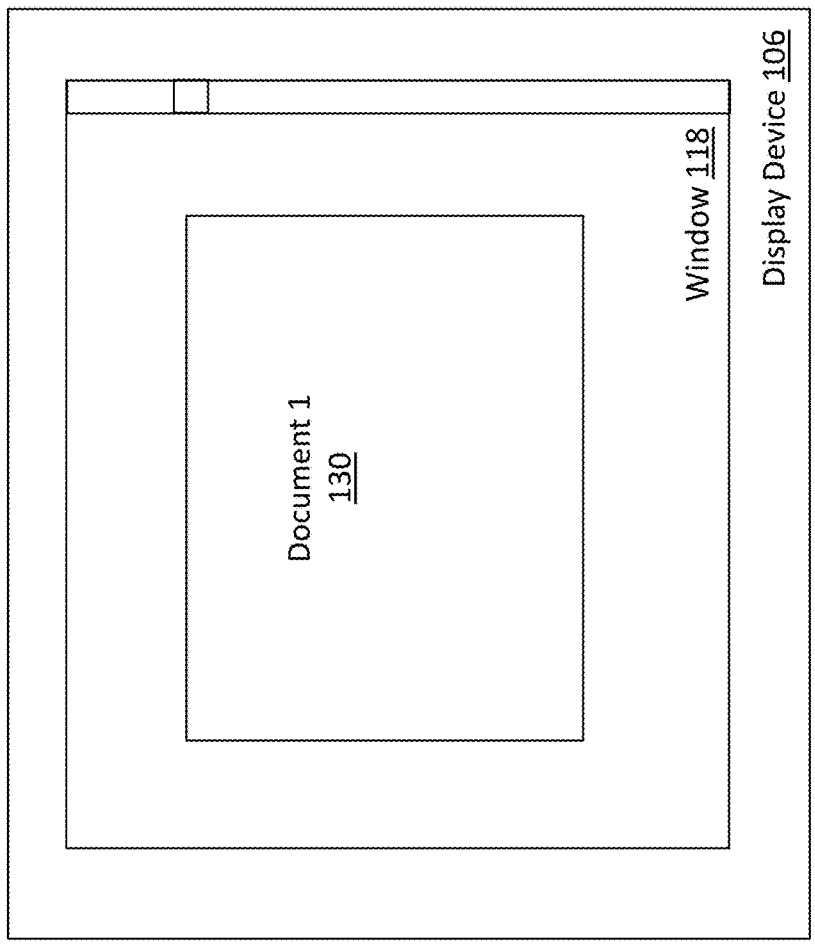

In response to a user selecting descriptive link 1 (136*b*), document 1 (130) may be displayed in window 118, as shown in FIG. 4C. More precisely, document 1 (128*a*) may be received by client device 102 and rendered into document 1 (130) by browser 104.

FIG. 4D depicts, for the third presentation mode, a screenshot of window 118 with an arrangement of search results that was displayed in response to the search query "orchids". The first search result includes the domain name "en.wikipedia.org" (136*a*), the descriptive link "Orchidaceae—Wikipedia" (136*b*), and the content snippet "Orchids are easily distinguished from other plants, as they share so . . . " (136*c*). It is noted that the "table" mode depicted in FIG. 4D contains a similar number of search results as the "dense" mode depicted in FIG. 3D.

Figure 5A:
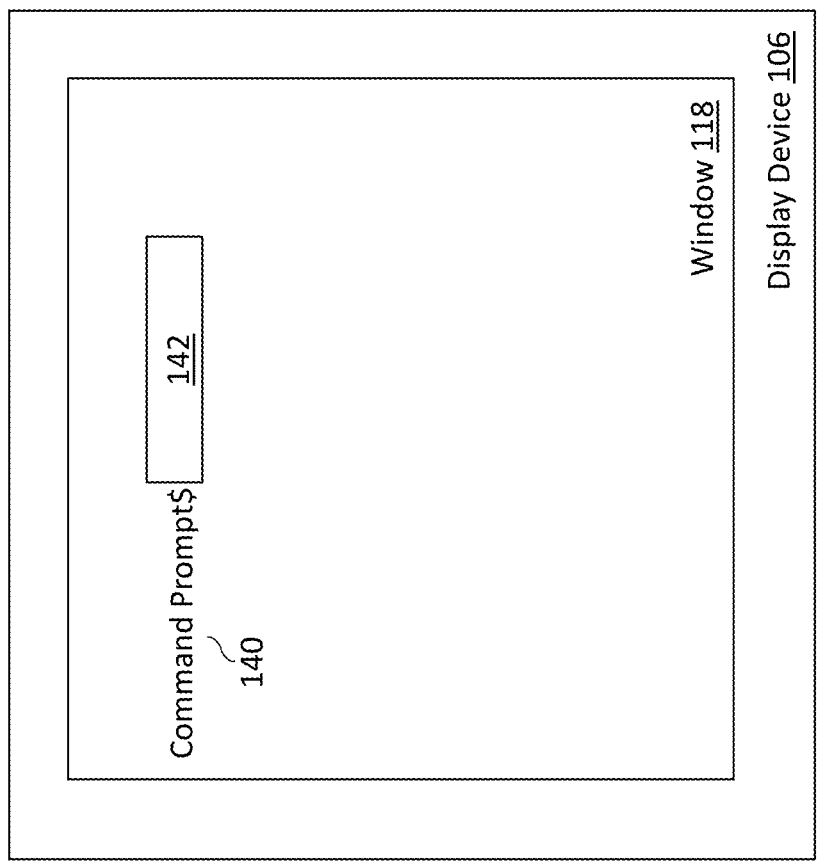
FIG. 5A depicts, for a fourth presentation mode, a window with a command line that accepts a query, in accordance with one embodiment of the present invention.

FIG. 5A depicts window 118 that may be displayed during the fourth presentation mode. Window 118 may include command prompt 140 and command line 142 that accepts a search query. Once the search query is submitted by the user in command line 142 (e.g., by pressing the enter or return key on a keyboard), search results may be retrieved and returned by search interface module 116. Similar to the first presentation mode, it is also possible for the search query to be received via a microphone of client device 102 (which captures a spoken version of the search query), and then transcribed using speech recognition software at client device 102 (or at another network-connected device) into a textual version of the search query.

Figure 5B:
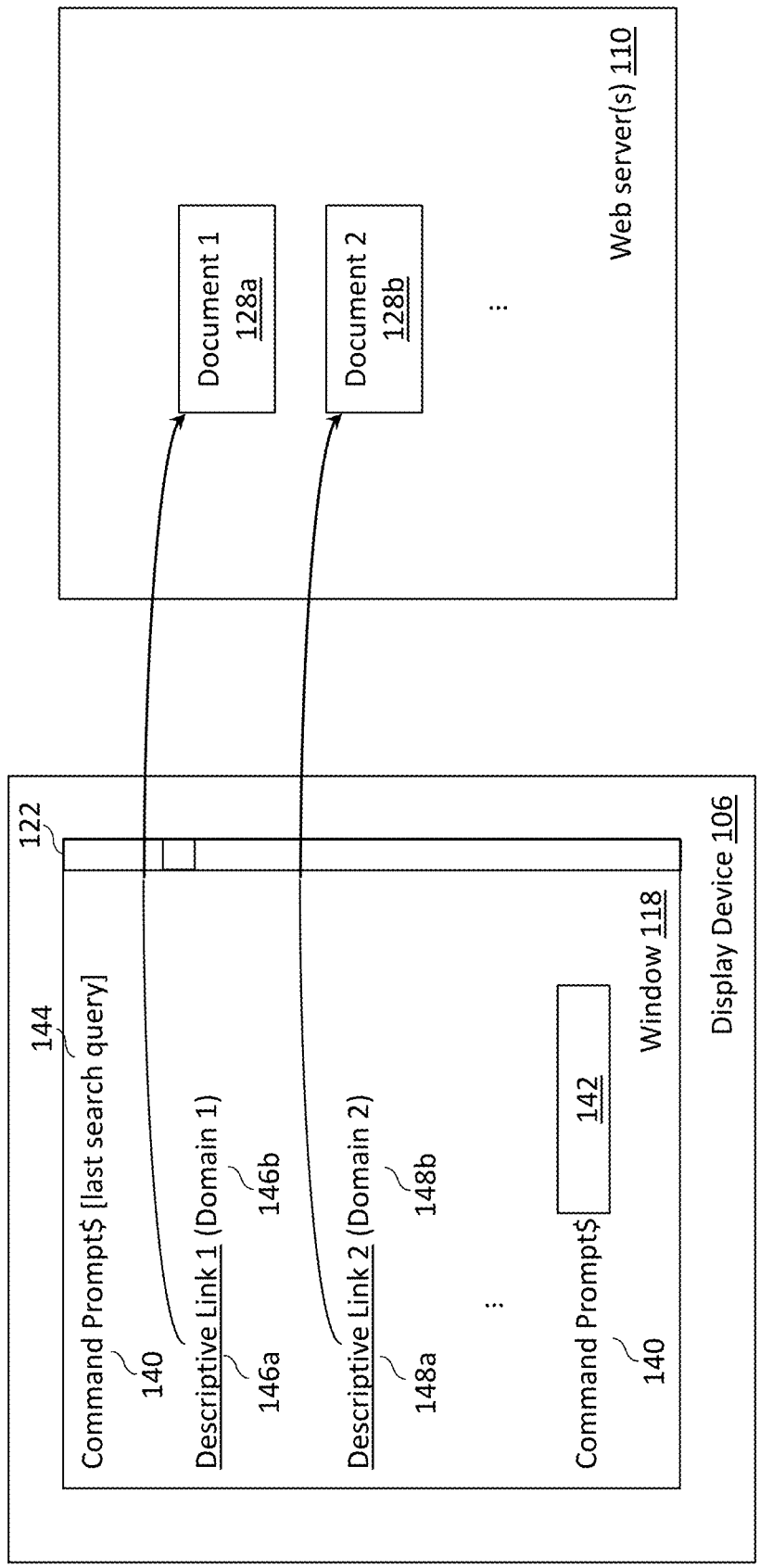
FIG. 5B depicts, for the fourth presentation mode, a window with an arrangement of search results that is displayed in response to a user submitting a search query in the command line, in accordance with one embodiment of the present invention.

FIG. 5B depicts window 118 with an ordered list of search results that may be displayed during the fourth presentation mode. The ordered list of search results may not be explicitly numbered, but it is understood that the top-most search result has a ranking of "1", the search result immediately below the top-most search result has a ranking of "2" and so on. As described above, the ordering of the search results may be assigned by search interface module 116 and may be based on a weighted combination of the rankings assigned to the search results by one or more of search engines 108a-108c. Window 118 may include several instances of command prompt 140. One instance of command prompt 140 may be displayed immediately adjacent to the last search query 144, while another instance of command prompt 140 may be displayed immediately adjacent to command line 142 which accepts the next search query.

Each of the search results may be displayed in a single line of window 118, and may include a descriptive link and a domain name. The descriptive link may include a hyperlink that is linked to a document that is deemed relevant to the search query. The anchor text of the descriptive link may include the title of (or other key word(s) that describe) the document that is linked from the descriptive link. The domain name may be that from which the document is accessible.

In the example of FIG. 5B, two search results are depicted. The first search result may include descriptive link 1 (146a) and domain name 1 (146b). Descriptive link 1 (146a) may be linked to document 1 (128a) that is stored at web server(s) 110. The second search result may include descriptive link 2 (148a) and domain name 2 (148b). Descriptive link 2 (148a) may be linked to document 2 (128b) that is stored at web server(s) 110. Window 118 may include scroll bar 122, allowing the contents of window 118 to be scrolled up or down, in the event that there are more search results than can be displayed in window 118 at a single time.

Figure 5C:
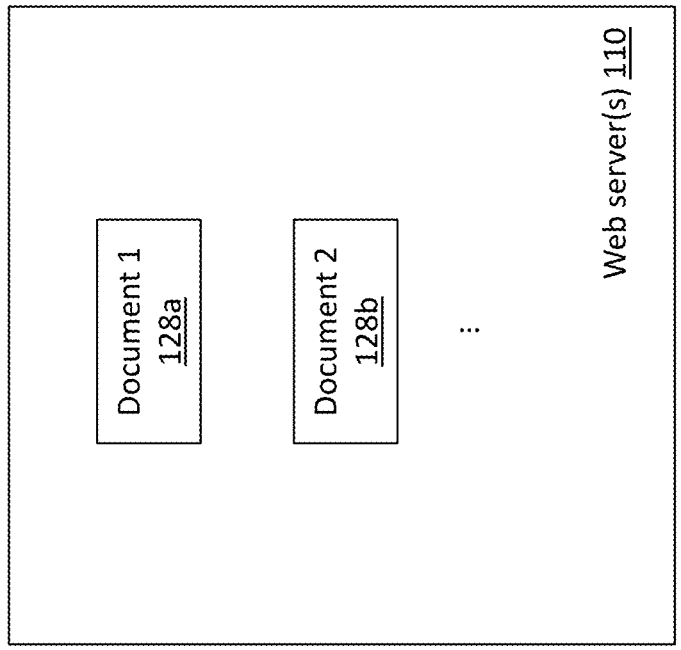
FIG. 5C depicts, for the fourth presentation mode, a window with a document returned in response to a user selecting one of the search results, in accordance with one embodiment of the present invention.
Figure 5C:
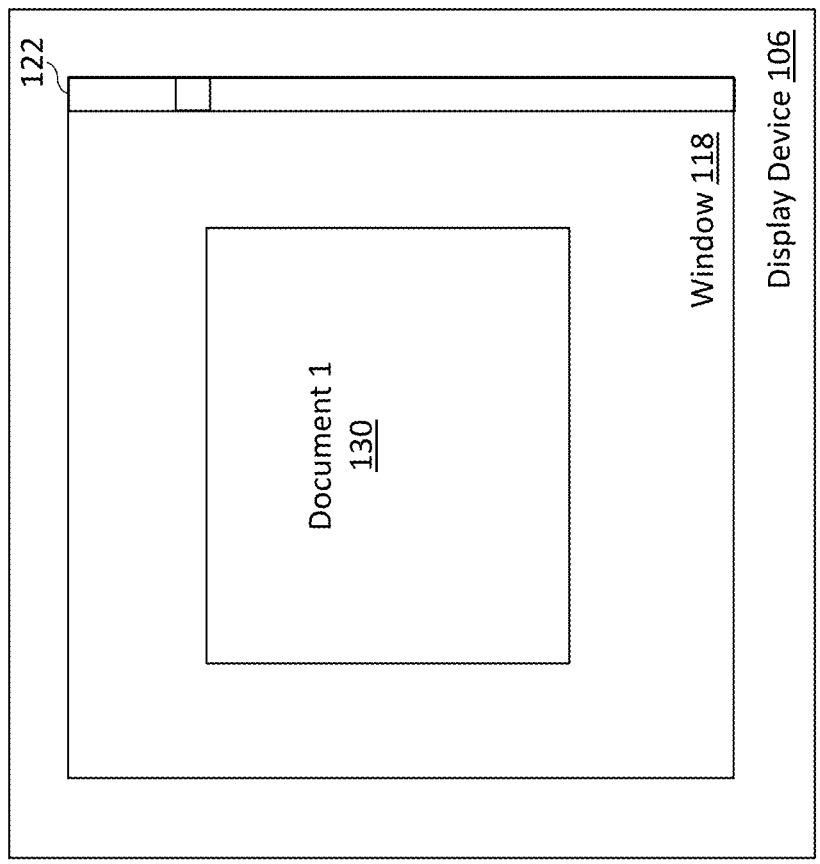

In response to a user selecting descriptive link 1 (146a) (using the keys of the keyboard to control a keyboard cursor and/or cursor controlling device to control a mouse cursor), document 1 (130) may be displayed in window 118, as shown in FIG. 5C. More precisely, document 1 (128a) may be received by client device 102 and rendered into document 1 (130) by browser 104.

Figure 5D:
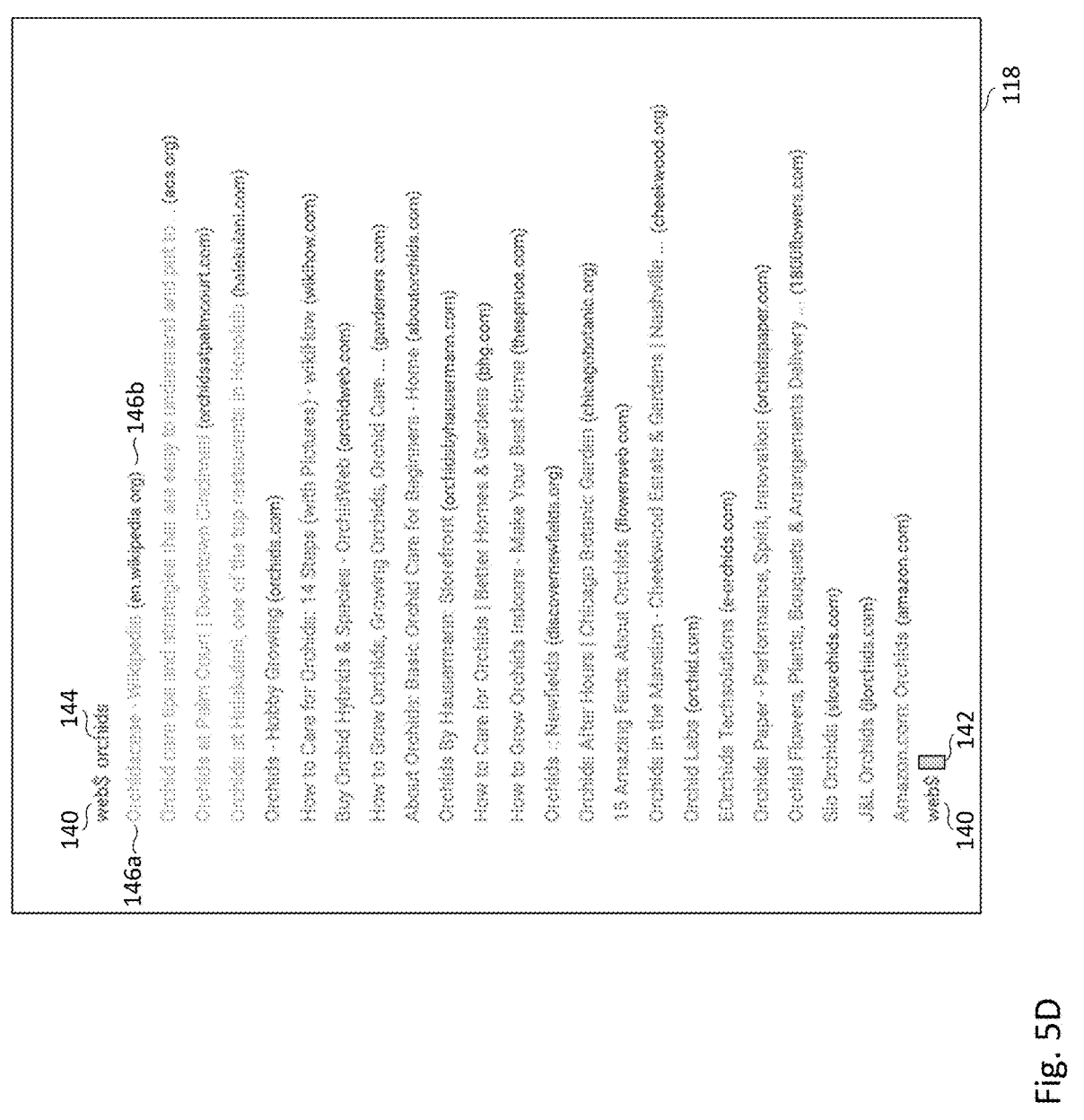

FIG. 5D depicts, for the fourth presentation mode, a screenshot of window 118 with an arrangement of search results that was displayed in response to the search query "orchids". The prompt "web$" (140) along with the previously submitted search query "orchids" (144) may be displayed in the top portion of window 118 (i.e., above the search results). The first search result includes the descriptive link "Orchidaceae—Wikipedia" (146a) and domain name "en.wikipedia.org" (146b). At the bottom of window 118 is another instance of the prompt "web$" (140) along with keyboard cursor 142, which indicates the position in window 118 at which the next search query may be entered. Further, keyboard keys (e.g., the arrow keys) may be used to position keyboard cursor 142 on or adjacent to each of the search results, allowing for the selection of one or more of the search results with the use of the keyboard only (i.e., without a cursor controlling device like a mouse).

Additional commands may be entered in the command line to filter the search results. For example, the command "cd" followed by a "string" may be used to limit the search to websites with domain names that include the specified "string". Additional commands may follow the syntax of established UNIX commands. For example, "cat website.com grep search_string" would search webpage(s) at "website.com" and return sentences or phrases in those webpage(s) that include the string "search_string".

FIG. 6A depicts window 118 that may be displayed during the fifth presentation mode. Window 118 may include text box 120 that accepts a search query. While not depicted in FIG. 6A for simplicity of illustration, it is understood that text may be shown in window 118 that instructs a user to enter one or more search terms into text box 120. Once the search query is submitted by the user (e.g., by pressing the enter or return key on a keyboard, clicking a submit icon in the user interface), search results may be retrieved and returned by search interface module 116. Similar to the first presentation mode, it is also possible for the search query to be received via a microphone of client device 102 (which captures a spoken version of the search query), and then transcribed using speech recognition software at client device 102 (or at another network-connected device) into a textual version of the search query.

For the sake of clarity, display device 106 is depicted as being part of client device 102. A data repository 150 is also depicted as being part of client device 102. The purpose of data repository 150 will become more apparent from the following description.

Figure 6B:
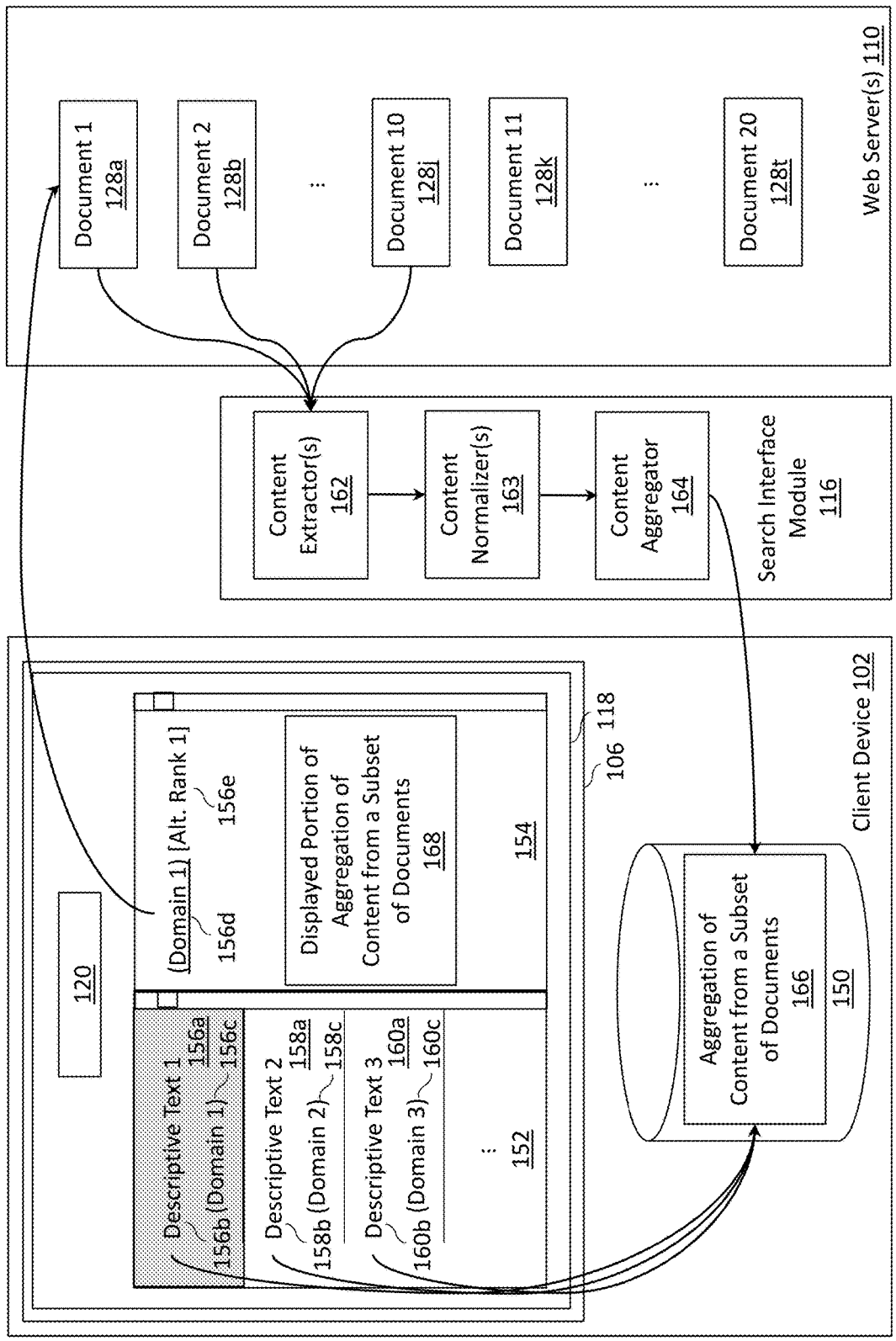
FIG. 6B depicts, for the fifth presentation mode, a window with an arrangement of search results that is displayed in response to a user submitting a search query, in accordance with one embodiment of the present invention.

In response to a search query being submitted in text box 120, a collection of documents may be identified by search interface module 116 to be relevant to the search query, and further the collection of documents may be ordered based on the relevance of each of the documents to the search query. In the example of FIG. 6B, the collection of documents includes documents 1-20 (128a-128t), with document 1 (128a) being the most relevant, document 2 (128b) being the next most relevant, and so on. The collection of documents may be stored at one or more web servers 110. Search interface module 116 may form a first aggregation of content from a first subset of documents from the collection of documents, and such aggregation of content 166 may be stored on data repository 150 on client device 102. In the example of FIG. 6B, the first subset of documents includes documents 1-10 (128a-128j).

More specifically, one or more content extractor(s) 162 may be used to extract content from each of the documents from the first subset of documents. The extracted content may include information that is relevant to the search query, but exclude information that is unconnected (or less connected) with the search query, such as advertisements. Information that is present in headers, footers and sidebars of a document (or other information that is likely not of interest to the user who submitted the search query) may also be removed by a content extractor. In practice, multiple content extractors may be instantiated at one time, each one on a separate virtual machine, so that the content from multiple documents can be extracted in parallel.

The extracted content may be provided to one or more content normalizers 163, which may normalize (i.e., make uniform) certain aspects of the extracted content, while preserving other aspects of the extracted content. Aspects such as the font style, font size, font color, line spacing (e.g., single space, 1.5 space, double space) and line alignment (e.g., left, center, right) may be normalized to match a set default style (which may be user configurable). On the other hand, aspects such as italicization, bolding, underlining, hyperlinks, headings and indentations in the extracted content may be preserved.

The extracted and normalized content may then be provided to content aggregator 164 which aggregates the extracted and normalized content into a first aggregation of content. Content aggregator 164 may preserve the ranking of documents, such that the most relevant document (i.e., document 1) appears first in the first aggregation, followed by the next most relevant document (i.e., document 2), and so on.

An ordered list of search results may be displayed in scrollable region 152 of window 118, in which each of the search results may include a linked region that is linked to a portion of the first aggregation. In the example of FIG. 6B, three linked regions are depicted (156a, 158a and 160a). Each of the linked regions may include descriptive text (e.g., title or one or more keywords from the content linked from the linked region) and a domain name from which the document used to generate the linked content may be accessed. In the example of FIG. 6B, linked region 156a includes descriptive text 1 (156b) and domain name 1 (156c); linked region 158a includes descriptive text 2 (158b) and domain name 2 (158c); and linked region 160a includes descriptive text 3 (160b) and domain name 3 (160c).

Further, a first one of the linked regions may be displayed in an emphasized manner (e.g., using a darker shading than linked regions that are not emphasized), and the first linked region may be linked to a first portion of the first aggregation including content of the document associated with the first search result (i.e., most relevant search result). When search results are presented immediately after a query is submitted, the linked region associated with the first search result will be the one displayed in an emphasized manner (as is shown in FIG. 6B in which linked region 156a is displayed in an emphasized manner). As will be explained in the description below, other linked regions may subsequently be displayed in an emphasized manner upon subsequent user commands.

In scrollable region 154 (i.e., separate from scrollable region 152), a link may be displayed which links to the document associated with the first search result. The anchor text of the link may be the domain name displayed in the emphasized linked region. In the example of FIG. 6B, domain name link 156d is linked to document 1 (128a) which is associated with the first search result.

Also in scrollable region 154, an alternative rank of the document associated with the first search result may be displayed. In the example of FIG. 6B, an alternative rank 1 (156e) is displayed in scrollable region 154, which is the alternative rank assigned to document 1 (128a) by a search engine (e.g., search engine 108a).

Also in scrollable region 154, a portion of the first aggregation containing the content linked from the emphasized linked region may be displayed. In the example of FIG. 6B, portion 168 from the first aggregation 166 may be displayed in scrollable region 154, and such portion contains content linked from emphasized linked region 156a. In contrast to the first through the fourth presentation modes, it is noted that the linked regions of the fifth presentation mode are not directly linked to documents stored on web server(s) 110. Rather, the linked regions are linked to (certain portions of) an aggregation of content 166 stored locally on data repository 150 of client device 102. The advantages of having the linked regions being linked to an aggregation of content (rather than the documents directly) will become more apparent in the description below.

Figure 6C:
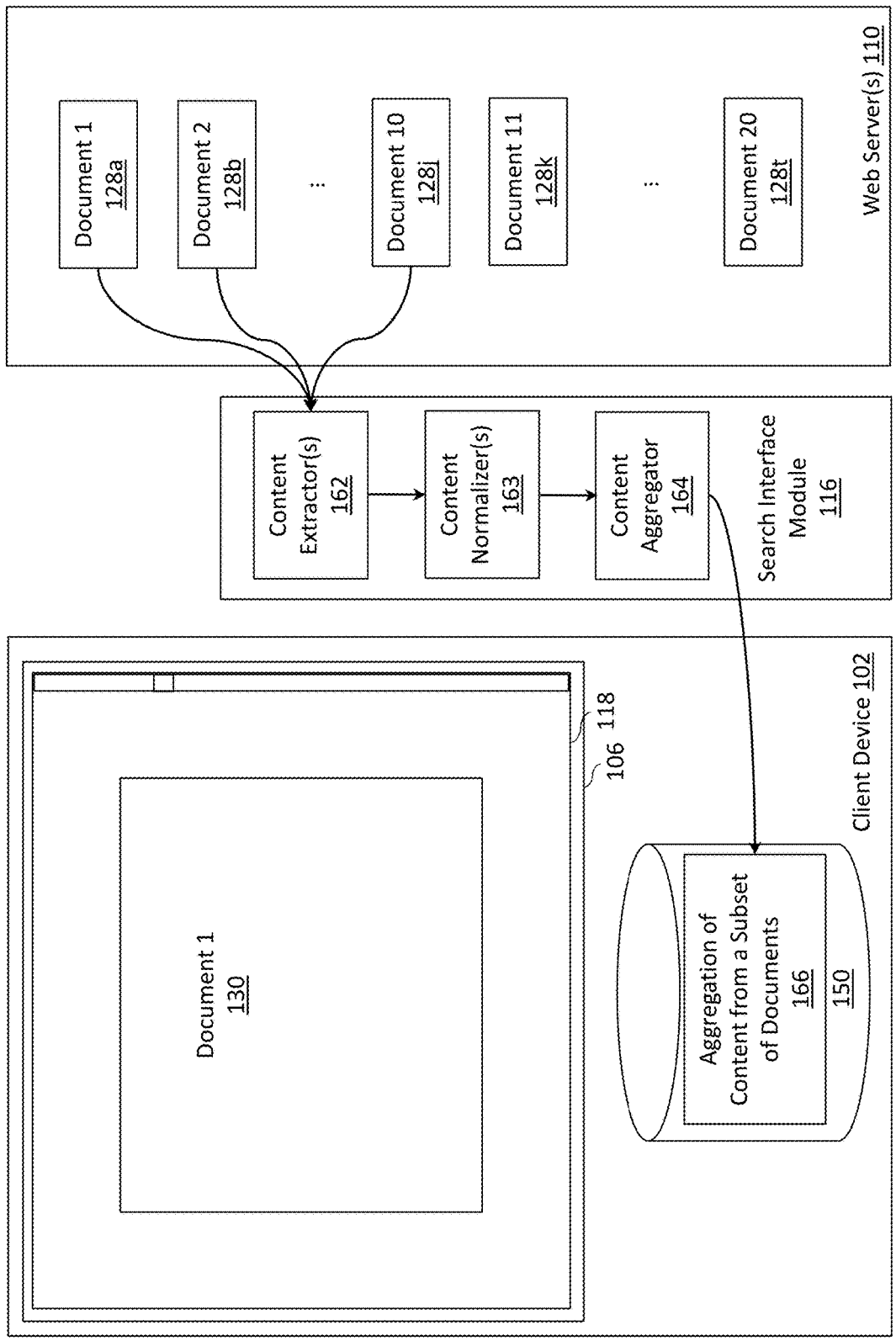
FIG. 6C depicts, for the fifth presentation mode, a window with a document returned in response to a user selecting one of the search results, in accordance with one embodiment of the present invention.

In response to a user selecting domain name link 156d, document 1 (130) may be displayed in window 118, as shown in FIG. 6C. More precisely, document 1 (128a) may be received by client device 102 and rendered into document 1 (130) by browser 104.

Figure 6D:
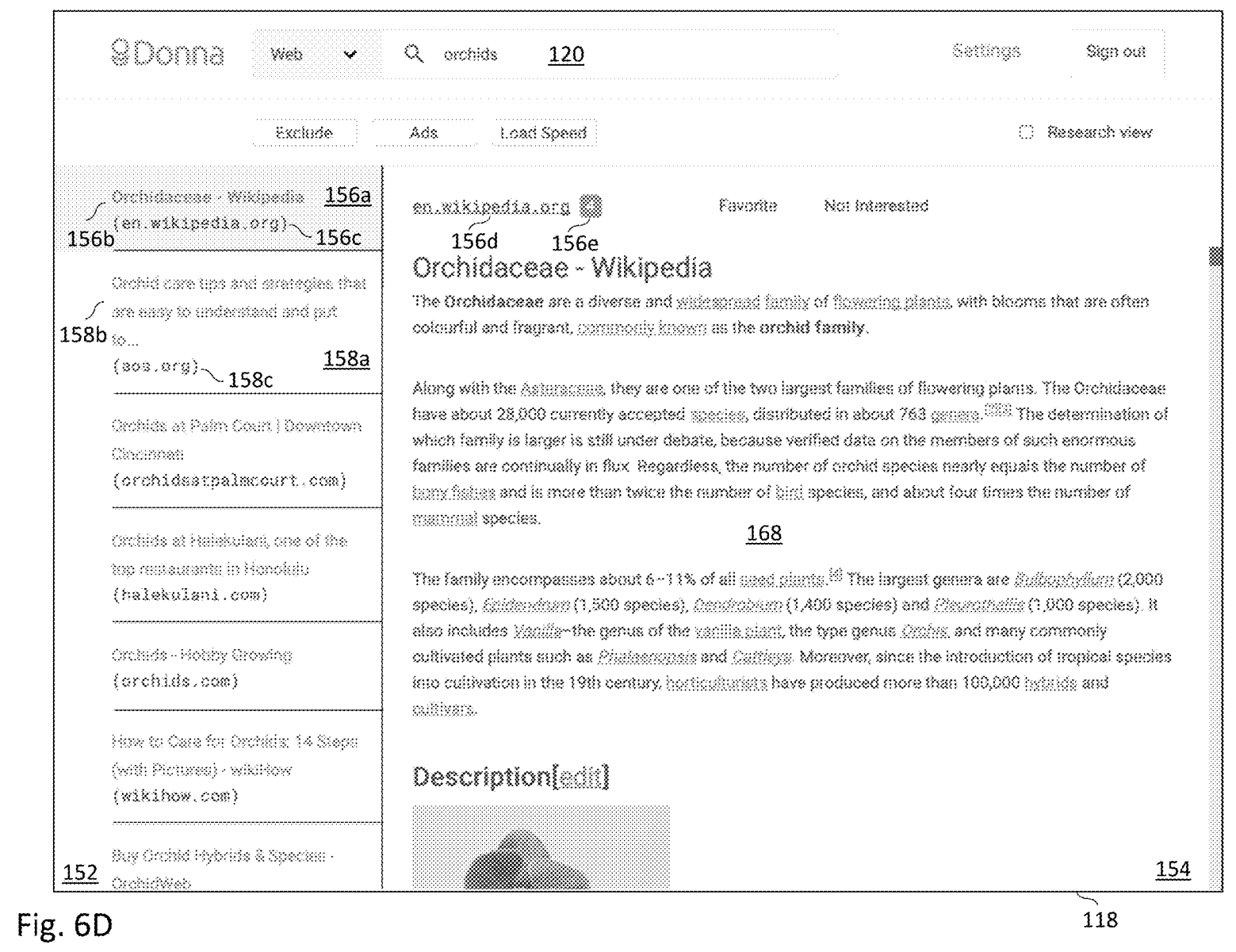

FIG. 6D depicts, for the fifth presentation mode, a screenshot of window 118 with an arrangement of search results that was displayed in response to the search query "orchids". More specifically, window 118 includes scrollable region 152 with the search results. The first search result includes linked region 156a, descriptive text "Orchidaceae—Wikipedia" (156b) and domain name "en.wikipedia.org" (156c). The second search result includes linked region 158a, descriptive text "Orchid care tips and strategies that are easy to understand and put to . . . " (158b) and domain name "aos.org" (158c). Linked region 156a is the emphasized linked region, as shown by the shading within linked region 156a.

Window 118 also includes scrollable region 154 which includes domain name link "en.wikipedia.org" (156d), which is linked to the document associated with the first search result. Scrollable region 154 also includes ranking "4" (156e), which is an alternative ranking assigned to the document associated with the first search result. Scrollable region 154 also includes portion 168 of the first aggregation including content extracted from the document associated with the first search result. If not already apparent, it is noted that in response to submitting the search query, both the search results and a portion of the content associated with the search results are displayed in a single window 118. Stated differently, the two-step procedure (i.e., input search query in text box 120, select one of search results) of the first through fourth presentation modes to view the content of the search results is collapsed into a one-step procedure ((i.e., input search query in text box 120) of the fifth presentation mode in which the content of at least some of the search results is already viewable after a single step.

Figure 6E:
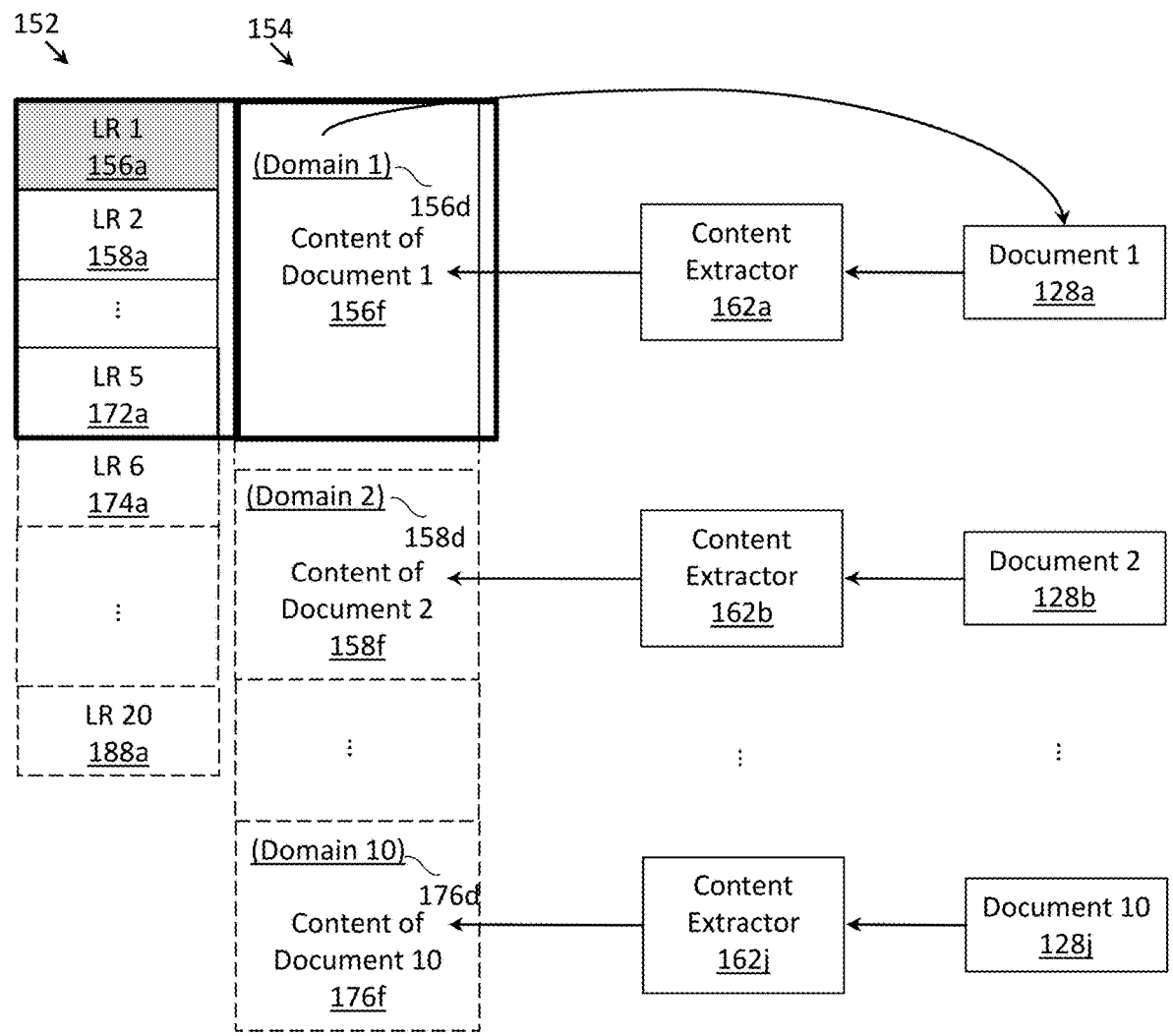
FIG. 6E depicts an abstracted version of the window of FIG. 6B, in accordance with one embodiment of the present invention.

FIG. 6E depicts an abstracted version of the window of FIG. 6B. For ease of explanation, the example in FIGS. 6E-6H assumes a total of twenty search results. Of the twenty search results, only five of the search results, represented by linked regions 1, 2, . . . 5 (126a, 158a, . . . 172a), are initially displayed in scrollable region 152. If not already apparent, "LR" is an abbreviation in the figures for "linked region". Search results 6-20, represented by linked regions 6, . . . , 20 (174a, . . . , 188a) are not initially displayed in scrollable region 152, and are abstractly depicted in dashed lines outside of scrollable region 152.

In the example of FIG. 6E, the first aggregation of content aggregates the content (156f, 158f, . . . 176f) from a first subset of documents, including documents 1, 2, . . . 10. It is noted that the number of documents within the first subset may depend on the download speed of client device 102. If client device 102 has a fast download speed, the number of documents may be a larger number (e.g., 20), whereas if client device 102 has a slow download speed, the number of documents may be a smaller number (e.g., 5). If not already apparent from FIG. 6E, the content (156f) of document 1 may be extracted from document 1 (128a) by content extractor 162a; the content (158f) of document 2 may be extracted from document 2 (128b) by content extractor 162b; . . . ; and the content (176f) of document 10 may be extracted from document 10 (128j) by content extractor 162j. Domain name links may be inserted into each of the extracted contents, and may link to the document from which the content was extracted. For example, domain name link "Domain 1" (156d) may link to document 1 (128a), domain name link "Domain 2" (158d) may link to document 2 (128b), . . . , and domain name link "Domain 10" (176d) may link to document 10 (128j). For clarity of illustration, only links (i.e., curved arrows between hyperlink and document) associated with hyperlinks that are visible in scrollable region 154 are depicted in FIG. 6E. It is noted that certain details of the user interface have been omitted from FIGS. 6E-6H for clarity of illustration, such as descriptive text and domain names in scrollable region 152 and alternative rankings in scrollable region 154 (which were shown in FIG. 6B).

A first portion of the first aggregation may be displayed in scrollable region 154. In the example of FIG. 6E, the first portion includes a portion of the content (156f) of document 1. The portion of the first aggregation that is not displayed in scrollable region 154 is depicted in dashed lines and includes a portion of the content (156f) of document 1, the content (158f) of document 2, . . . , and the content (176f) of document 10.

Figure 6F:
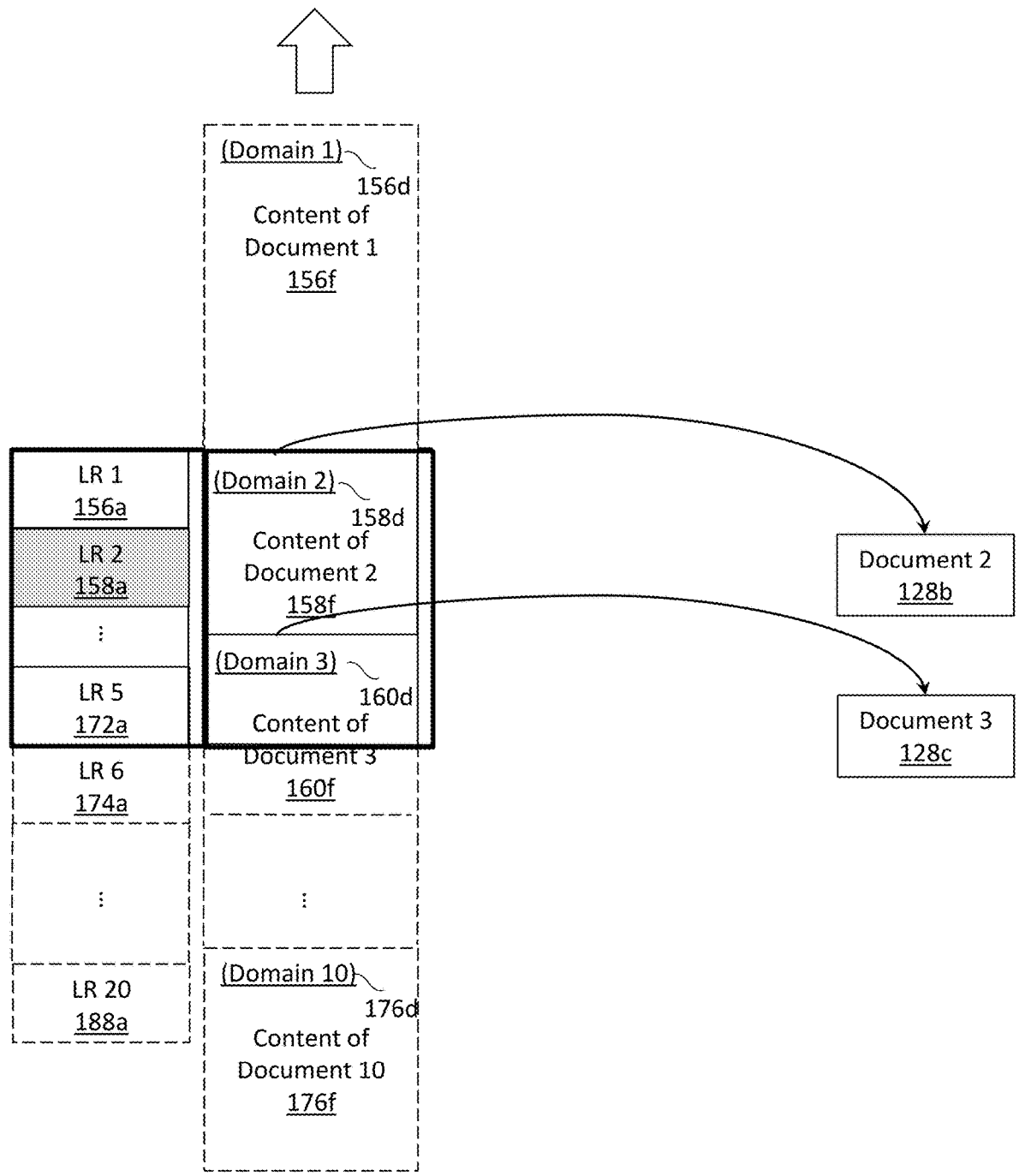
FIG. 6F depicts an abstracted version of the window of FIG. 6B, after a command has been received to scroll down through an aggregation of content displayed in a second scrollable region of the window, in accordance with one embodiment of the present invention.

FIG. 6F depicts the result of receiving a command from a user to scroll, in scrollable region 154, from the first portion of the first aggregation to a second portion of the first aggregation, the second portion of the first aggregation including content (158f) from document 2. In response to such user command, in first scrollable region 152, the linked region 1 (156a) is displayed in a de-emphasized manner and linked region 2 (158a) is depicted in an emphasized manner. Also, in response to such user command, at least a beginning of the second portion of the first aggregation is displayed in scrollable region 154. In the particular example of FIG. 6F, the content (158f) of document 2 is short, so a portion of the content (160f) of document 3 which follows the content of document 2 in the first aggregation is also displayed in scrollable region 154. If not already apparent, the content (156f) of document 1 is no longer visible in scrollable region 154 so it is depicted in dashed lines. A domain name link "Domain 2" (158d) may also be displayed at the beginning of the content of document 2 in scrollable region 154, and may be linked to document 2 (128b) which is associated with the second search result. Similarly, a domain name link "Domain 3" (160d) may also be displayed at the beginning of the content of document 3 in scrollable region 154, and may be linked to document 3 (128c) which is associated with the third search result.

The example of FIG. 6F illustrates a convenient aspect of the fifth presentation mode, in that the user may simply scroll from the content of one document to the content of the next document associated with the search results. In comparison, in a conventional search interface, the user would be required to perform a sequence of steps in order to switch from viewing one document to viewing the next document associated with the search results. In particular, after viewing one document, the user would be required to click the "back" button in the browser, and click the hyperlink of the next document, before being able to view the next document.

Figure 6G:
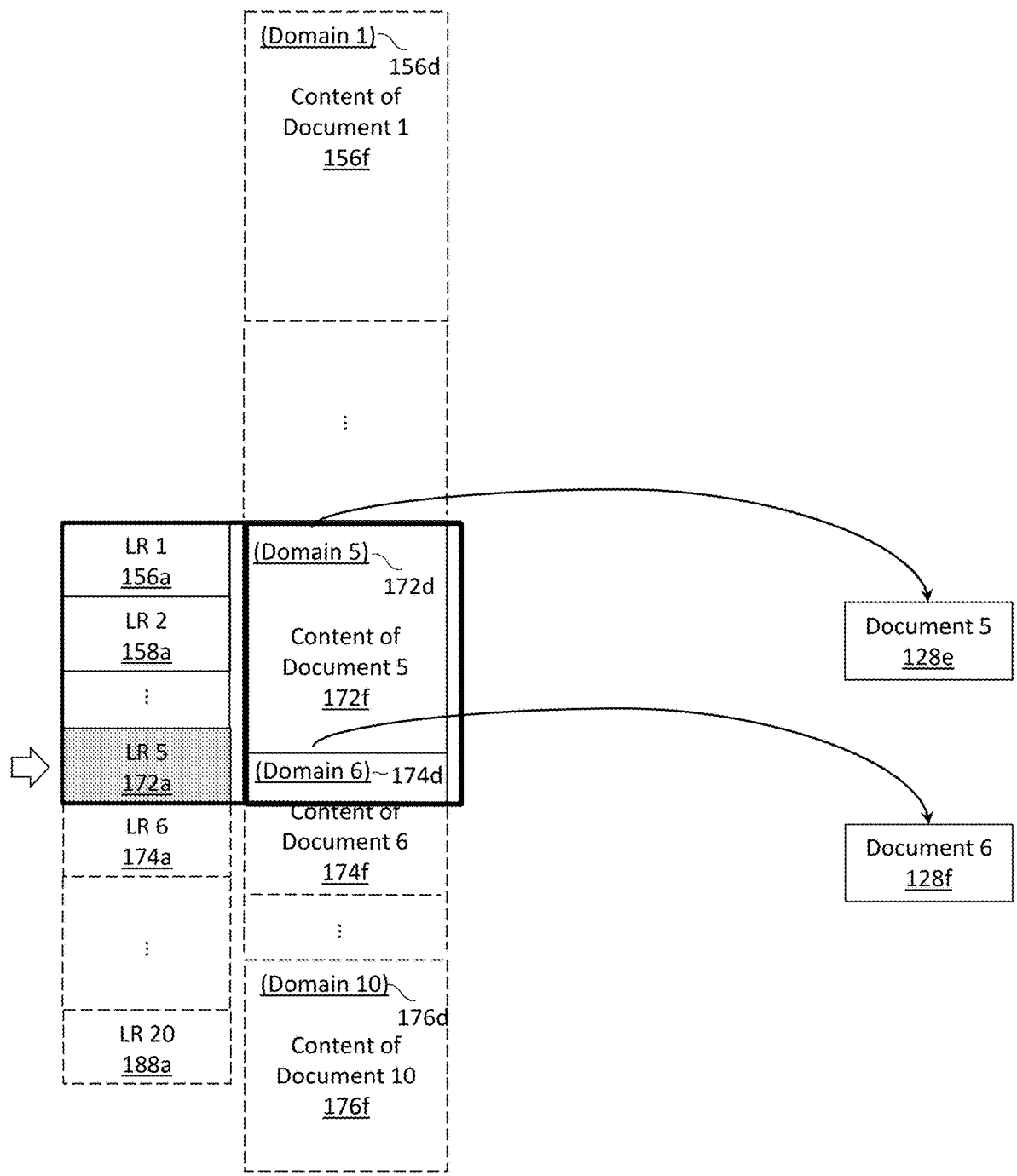
FIG. 6G depicts an abstracted version of the window of FIG. 6B, after a command has been received to select a linked region in a first scrollable region of the window, in accordance with one embodiment of the present invention.

FIG. 6G depicts the result of receiving a command from a user to select linked region 5 (172a) in scrollable region 152, which is linked to a fifth portion of the first aggregation including content (172f) of document 5. In response to such user command, linked region 2 (158a) may be displayed in a de-emphasized manner, and linked region 5 (172a) may be displayed in an emphasized manner in scrollable region 152. Also, in response to such user command, at least a beginning of the fifth portion of the first aggregation is displayed in scrollable region 154. In the particular example of FIG. 6G, the content (172f) of document 5 is short, so a portion of the content (174f) of document 6 which follows the content of document 5 in the first aggregation is also displayed in scrollable region 154. A domain name link "Domain 5" (172d) may also be displayed at the beginning of the content of document 5 in scrollable region 154, and may be linked to document 5 (128e) which is associated with the fifth search result. Similarly, a domain name link "Domain 6" (174d) may also be displayed at the beginning of the content of document 6 in scrollable region 154, and may be linked to document 6 (128f) which is associated with the sixth search result.

The example of FIG. 6G illustrates another convenient aspect of the fifth presentation mode, in that the user is able to still access the search results while viewing the contents of a document. In a conventional search interface, while viewing a document, the user is required to select the "back" button of a browser before being able to access the search results. In the instant presentation mode, the search results are presented in scrollable region 152 and the contents of a document are presented in scrollable region 154, so there is no need to select the "back" button to view the search results. Another convenient aspect is that the contents of the first N search results are already preloaded on client device 102 (in which N=10 in the example of FIGS. 6A-6H). For example, in response to selecting linked region 5, the contents of document 5 are instantly available (i.e., no wait to download the contents from web server(s) 110), whereas in a conventional search interface, document 5 would need to be downloaded from web server(s) 110 before document 5 can be viewed.

Figure 6H:
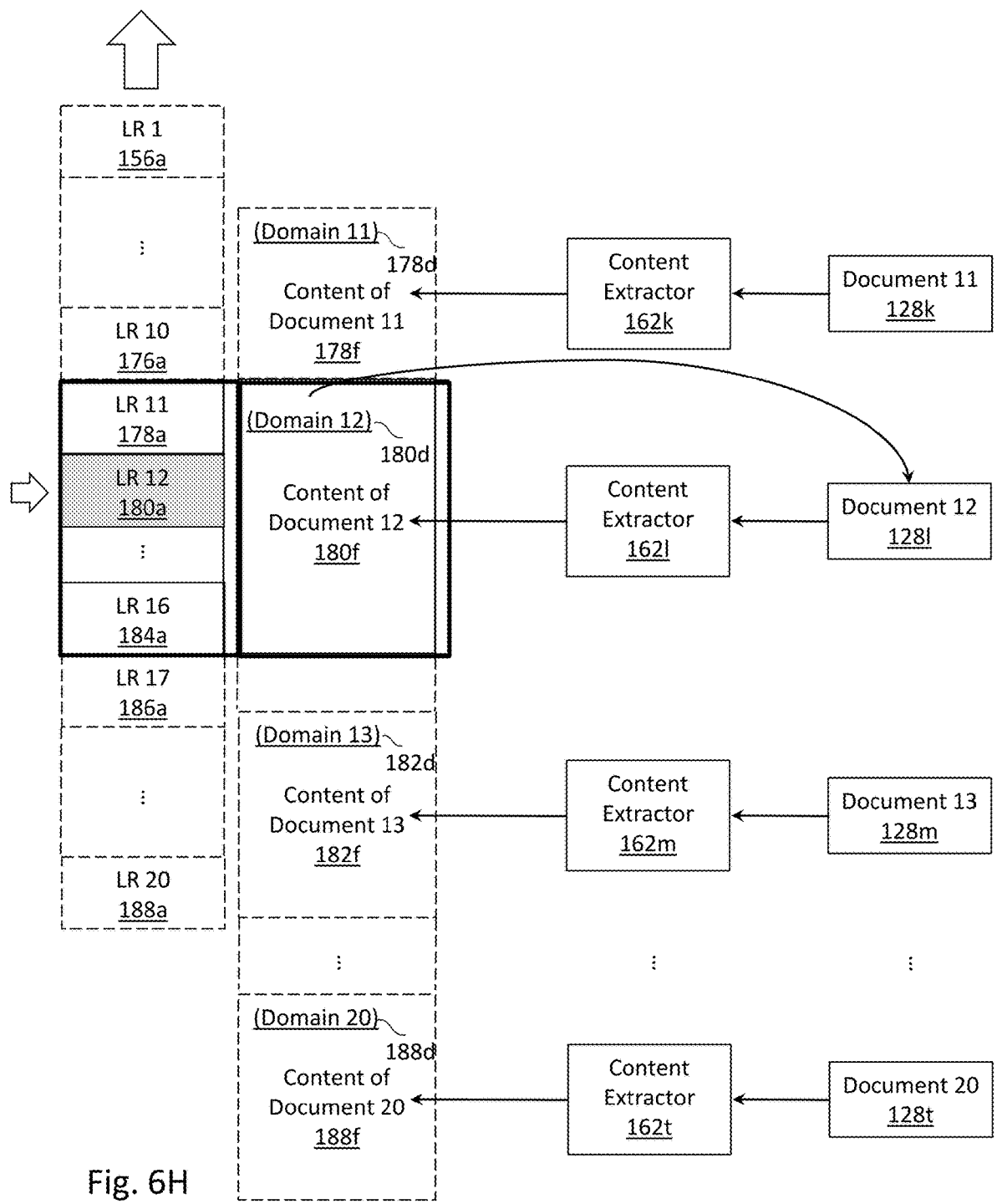
FIG. 6H depicts an abstracted version of the window of FIG. 6B, after a command has been received to (i) scroll down through the search results displayed in the first scrollable region of the window and (ii) select a linked region in the first scrollable region, in accordance with one embodiment of the present invention.

FIG. 6H depicts the result of receiving a command from a user to scroll down in the search results and select linked region 12 (180a). Since the contents of the twelfth search result are not included in the first aggregation of content, a second aggregation of content may be pre-loaded onto data repository 150 in response to the user commands. The second aggregation of content may include the contents (178f) of document 11, the contents (180f) of document 12, the contents (182f) of document 13, . . . , and the contents (188f) of document 20. If not already apparent from FIG. 6H, the content (178f) of document 11 may be extracted from document 11 (128k) by content extractor 162k; the content (180f) of document 12 may be extracted from document 12 (128l) by content extractor 162l; the content (182f) of document 13 may be extracted from document 13 (128m) by content extractor 162m; . . . ; and the content (188f) of document 20 may be extracted from document 20 (128t) by content extractor 162t. Domain name links may be inserted into each of the extracted contents, and may link to the document from which the content was extracted. For example, domain name link "Domain 11" (178d) may link to document 1 (128k), domain name link "Domain 12" (180d) may link to document 12 (128l), domain name link "Domain 13" (182d) may link to document 13 (128m), . . . , and domain name link "Domain 20" (188d) may link to document 20 (128t). For clarity of illustration, only links (i.e., curved arrows between hyperlink and document) associated with hyperlinks that are visible in scrollable region 154 are depicted.

Also in response to the user command to scroll down in the search results and select linked region 12 (180a), linked region 12 (180a) may be displayed in an emphasized manner in scrollable region 152. Also in response to these user commands, a portion of the second aggregation may be displayed in scrollable region 154 which includes at least a beginning of the content (180f) of document 12.

FIG. 6H illustrates a tradeoff present in the fifth presentation mode. When a search result is select that is not already pre-loaded (e.g., linked region 12), the contents of N documents are retrieved in order to view the contents of that the selected search result (i.e., N=10 in the present example). If the download speed is not that fast, there may be a noticeable delay before the contents of the selected search result may be viewed. In comparison, in a conventional search interface, only the (single) document associated with a search result is retrieved in response to selection of that search result.

Figure 6I:
FIG. 6I depicts, for the fifth presentation mode, a screenshot of a window with an arrangement of search results that is displayed in response to a user scrolling down through an aggregation of content displayed in the second scrollable region of the window, in accordance with one embodiment of the present invention.

FIG. 6I depicts, for the fifth presentation mode, a screenshot of a window with an arrangement of search results that is displayed in response to a user scrolling down through an aggregation of content displayed in scrollable region 154. Content 156f corresponds to linked region 156a, while content 158f correspond to linked region 158a. Notice how linked region 156a is the emphasized region. So that the user may readily distinguish between the contents of two documents, separator line 190 may be depicted to clearly indicate the boundary between the contents of the two documents.

Figure 6J:
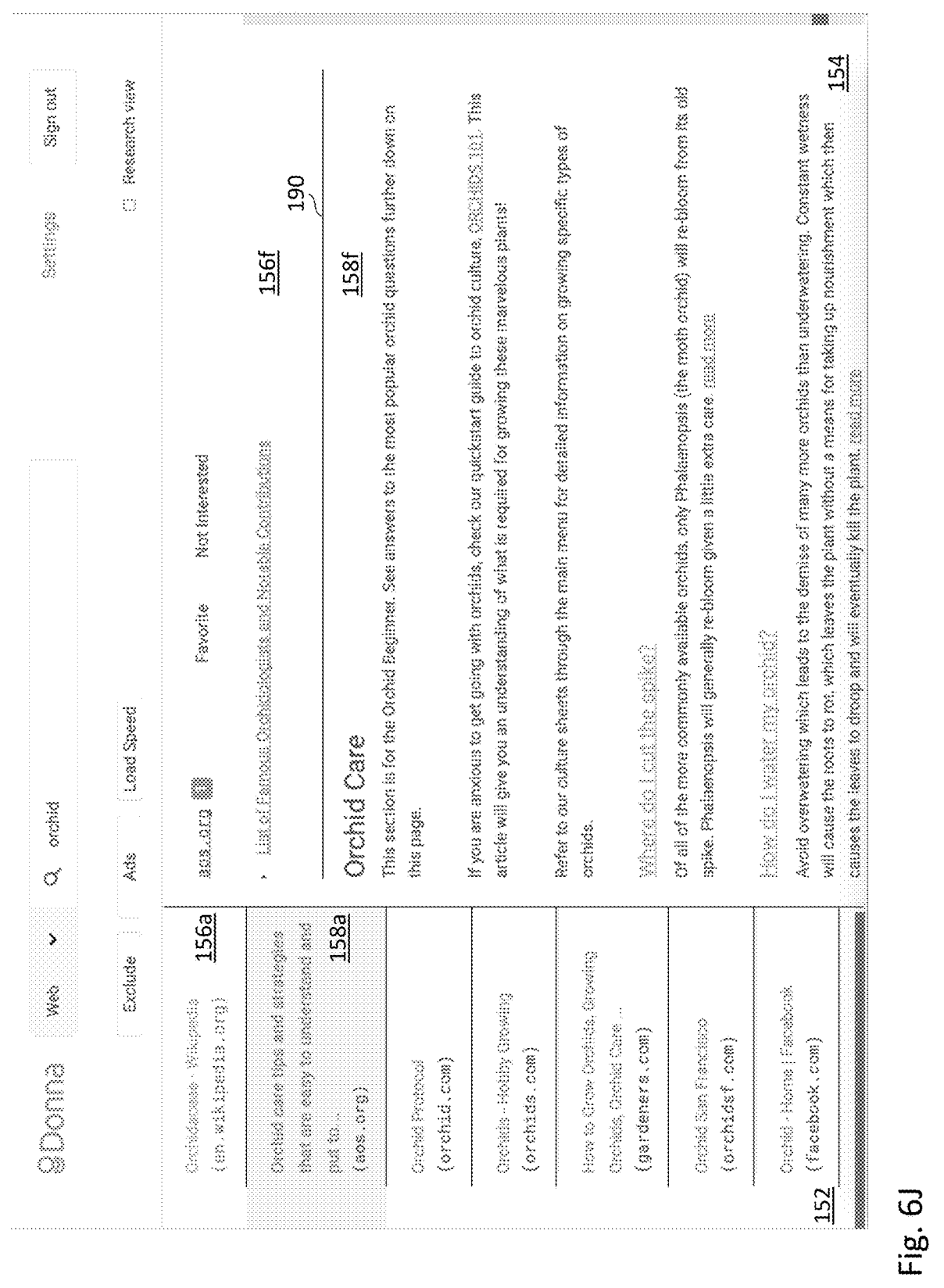

FIG. 6J depicts a screenshot of the window of FIG. 6I after further scrolling down in the aggregation of content displayed in scrollable region 154. Content 156f corresponds to linked region 156a, while content 158f correspond to linked region 158a. Notice how linked region 158a is now the emphasized region (as only a very small portion of the content associated with linked region 156a is still visible in scrollable region 154).

Figure 7A:
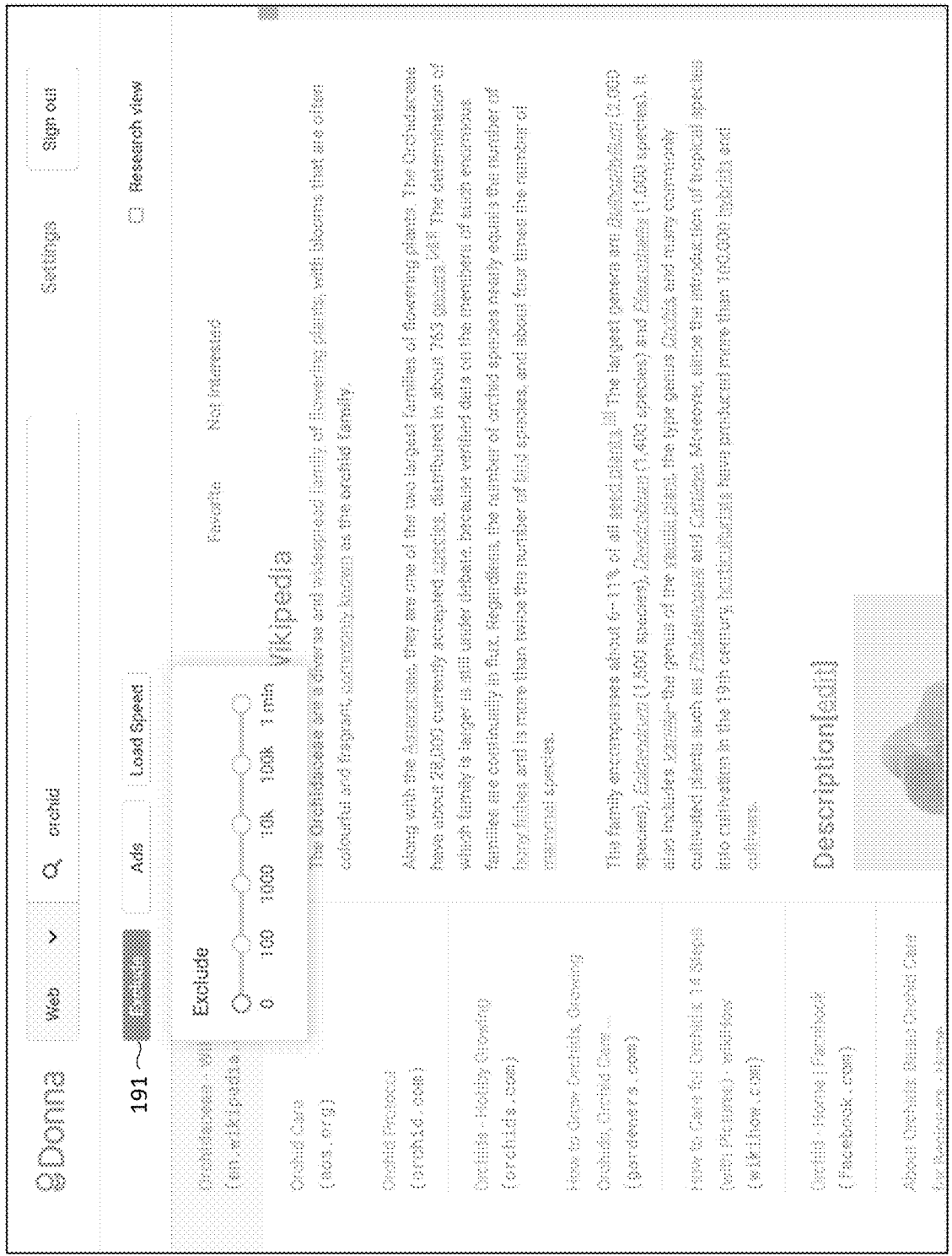
FIG. 7A depicts a screenshot of a window with a user interface element for configuring a filtering of the search results based on a number of prior views of each of the search results, in accordance with one embodiment of the present invention.

FIG. 7A depicts a screenshot of a window with a user interface element for configuring a filtering of the search results based on a number of prior views of each of the search results. The user interface element allows the user to exclude the top 100 viewed documents (i.e., view most documents, but not the very popular documents), . . . , exclude the top 1,000,000 viewed documents (i.e., view only the documents that have been rarely viewed by others).

Figure 7B:
FIG. 7B depicts a screenshot of a window with a user interface element for selecting whether or not to display advertisements in the search results, in accordance with one embodiment of the present invention.

FIG. 7B depicts a screenshot of a window with a user interface element for selecting whether or not to limit the search results to documents without advertisements. If the option "No Ads" is selected, only documents without advertisements will be included in the search results. If the option "With Ads" is selected, all documents (either with or without advertisements) will be included in the search results. For clarity, it is noted that such an option is different from an ad blocking options which might request ads to be removed from documents. The instant option is a filtering option to (if enabled) filter out all documents which have one or more ads embedded within the document.

Figure 7C:
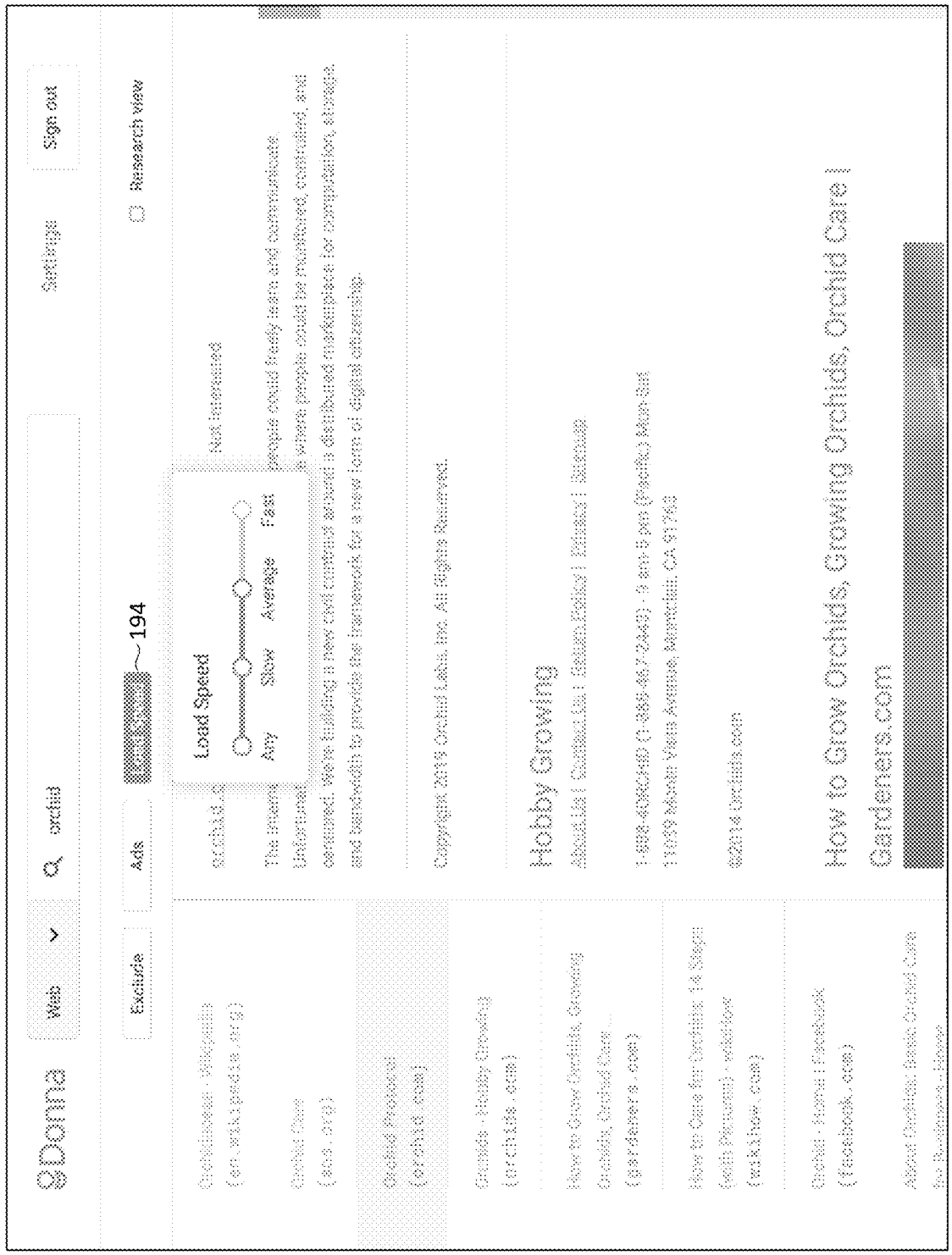
FIG. 7C depicts a screenshot of a window with a user interface element for configuring a filtering of the search results based on the minimum document load speed, in accordance with one embodiment of the present invention.

FIG. 7C depicts a screenshot of a window with a user interface element for configuring a filtering of the search results based on the minimum document load speed. The "Any" option may permit any document to be loaded. The "Slow" option may set a lower bound on the load speed permitted for documents. The "Average" option may set a stricter lower bound on the load speed permitted for documents. The "Fast" option may set an even stricter lower bound on the load speed permitted for documents (permitting the download of only documents that can be loaded in a short amount of time). The document load speed in this context relates to the typical time in which a document can be loaded by a browser. As a non-limiting example, the "Slow" option may filter out all documents that typically take more than 1 second for a browser to load; the "Average" option may filter out all documents that typically take more than 5 ms for a browser to load; and the "Fast" option may filter out all documents that typically take more than 1 ms for a browser to load.

Figure 8A:
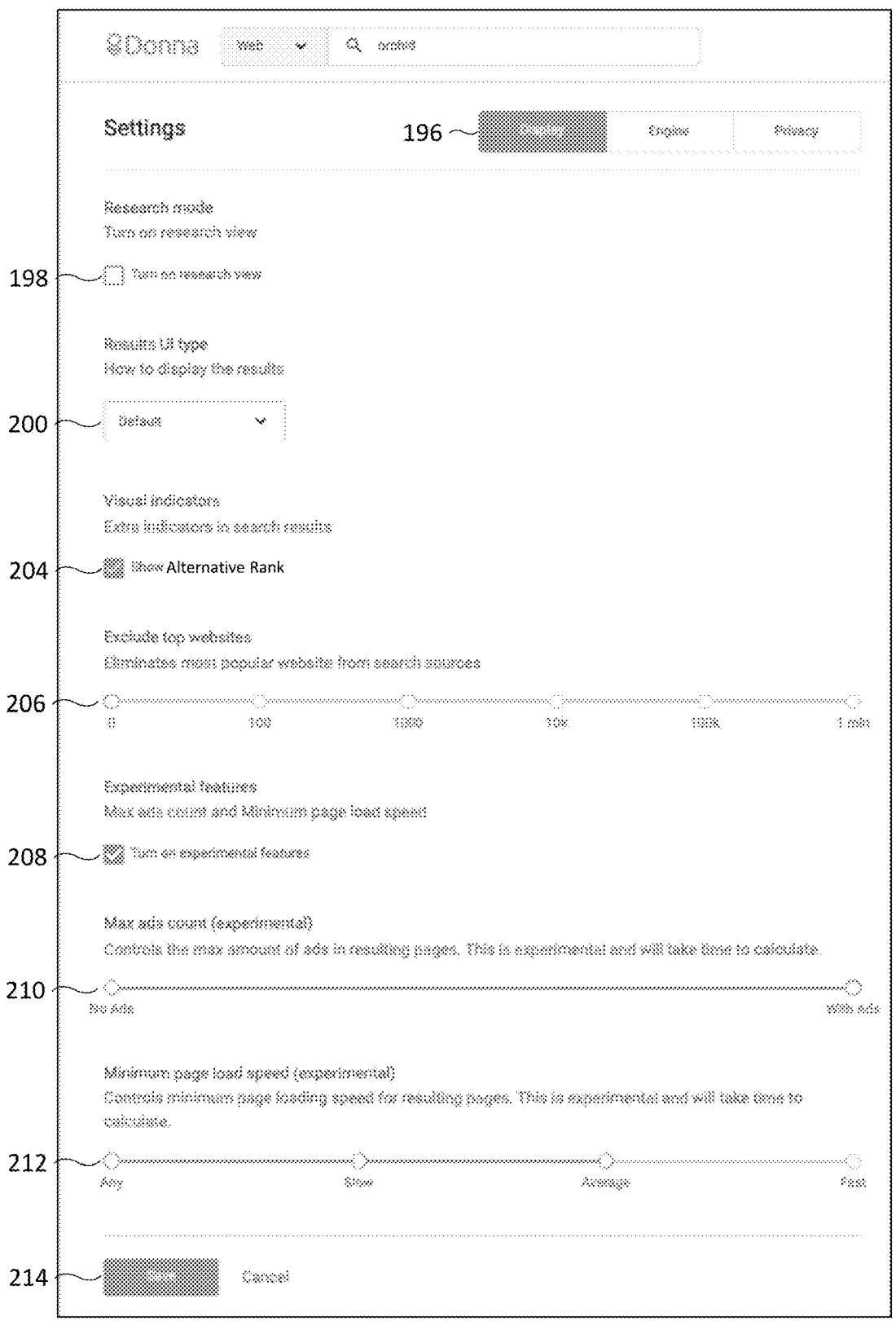
FIG. 8A depicts a screenshot of a window to configure display settings of the search interface module, in accordance with one embodiment of the present invention.
Figure 8B:
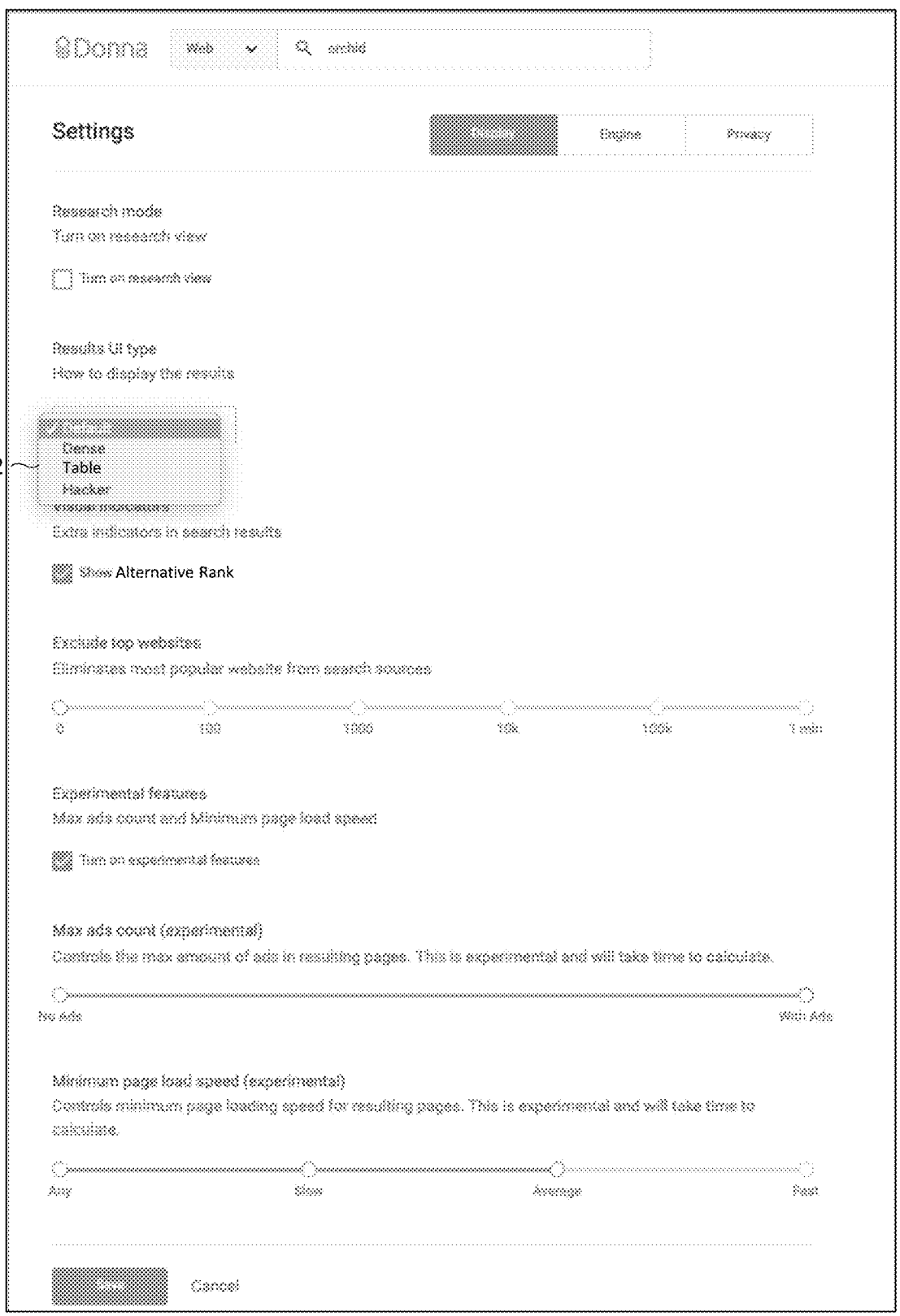
FIG. 8B depicts a screenshot of a window to configure display settings of the search interface module, in accordance with one embodiment of the present invention.

FIG. 8A depicts a screenshot of a window to configure display settings of the search interface module. Checkbox 198 may allow the user to select the fifth presentation mode (also called the "research mode"). Dropdown menu 200 may allow the user to select between the first through the fourth presentation modes. See expanded menu 202 in FIG. 8B with four selectable modes. Checkbox 204 allows the user to view alternative ranks. Slider bar 206 allows the user to configure a filtering of the search results based on a number of prior views of each of the search results (similar to the user interface element depicted in FIG. 7A). Checkbox 208 allows the user to enable experimental features, such as ad blocking and filtering documents based on the minimum document load speed. Slider bar 210 allows the user to allow or not allow the display of ads (similar to the user interface element depicted in FIG. 7B). Slider bar 212 allows the user to filter documents based on the minimum document load speed (similar to the user interface element depicted in FIG. 7C). Upon the input of the display settings, the display settings may be saved by selecting the save button 214.

Figure 8C:
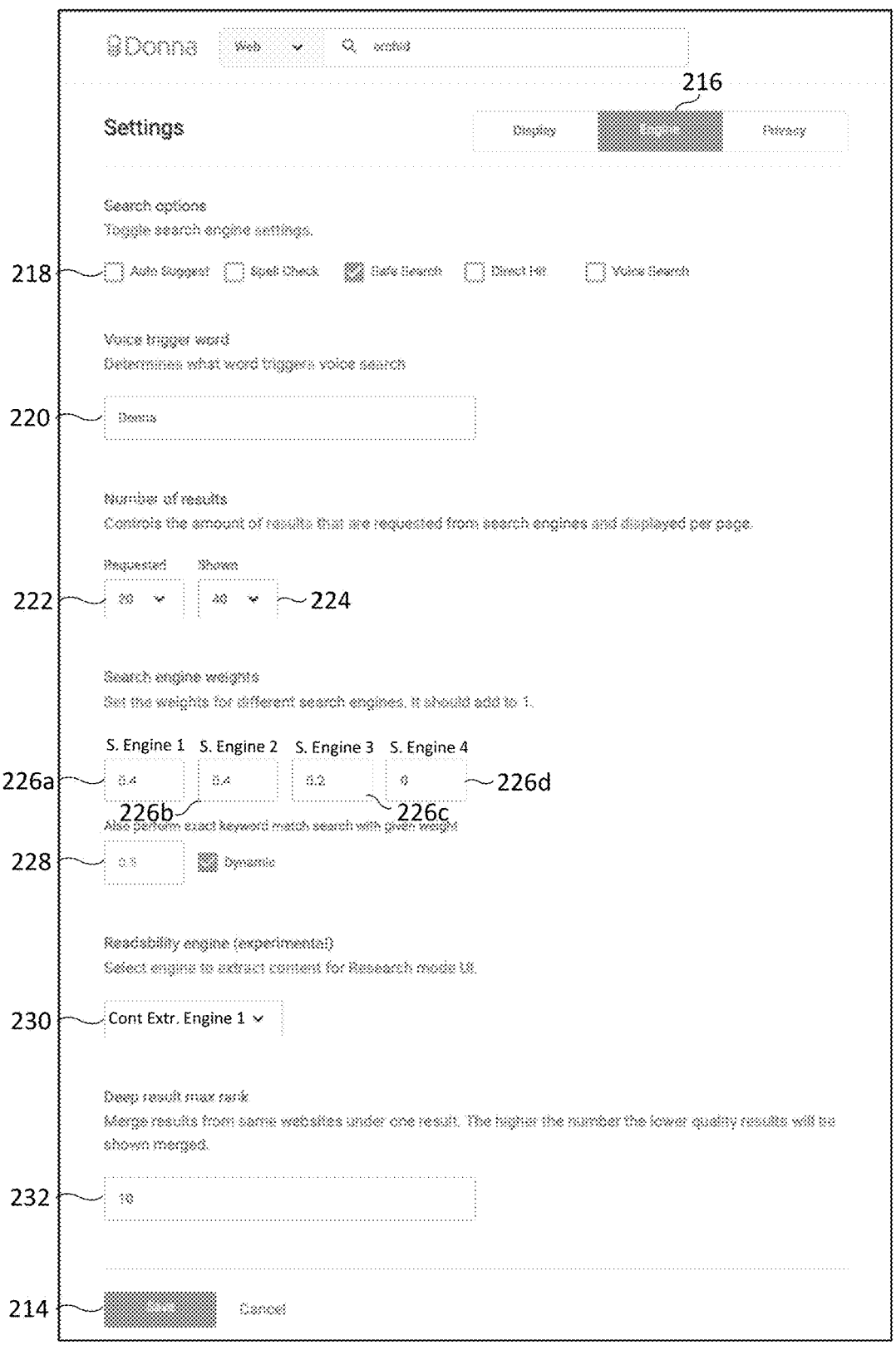
FIG. 8C depicts a screenshot of a window to configure search settings of the search interface module, in accordance with one embodiment of the present invention.

FIG. 8C depicts a screenshot of a window to configure search settings of the search interface module. Check boxes 218 permit the selection of one or more search options, including "Auto Suggest", "Spell Check", "Safe Search", "Direct Hit" and "Voice Search". With the "Auto Suggest" option enabled, search interface module 116 may automatically suggest words for the user to include in the search query. For example, when "united" is entered as a search term, search interface module 116 may automatically suggest the word "states" or "airlines". With the "Spell Check" option enabled, search interface module 116 may automatically correct the spelling of search terms. With the "Safe Search" option enabled, search interface module 116 may only return documents that do not include adult content (e.g., nudity, pornography, etc.). With the "Direct Hit" option enabled, search interface module 116 may directly load the top search result into display 118, after receiving the search query from the user. With the "Voice Search" option enabled, client device 102 may be configured to receive a search query via voice input.

Text box 220 permits the input of a voice trigger word, which specifies a word that activates the voice search option. Dropdown menu 222 permits the selection of the number of search results that are requested from each of the search engines before those results are assembled into one list of search results by search interface module 116. Dropdown menu 224 permits the selection of the number of search results that are returned by search interface module 116. In the example of FIG. 6B, the number of "shown" results is twenty, as a total of twenty documents were deemed relevant to the search query. For clarity, it is noted that this number of "shown" results does not refer to the number of results that are shown at a particular time and more closely relates to the number of results that are available to be shown by search interface module 116. While not included in the screenshot of FIG. 8A, another parameter that may be configured by the user is the number of documents that are preloaded together (i.e., the parameter that was previously called "N").

Weights may be input into textboxes 226a, 226b, 226c and 226d in order to specify a weight for rankings provided by a first, second, third, and fourth search engine, respectively. The search result rankings of search interface module 116 may be formed by linearly combining the respective rankings of the search engines, weighted by the weights specified in the instant textboxes. Textbox 228 specifies the amount of weight to give to search results that match the search query exactly. More specifically, two searches may be performed—one search requiring the search results match the search query exactly (i.e., considering the search query as a single text string), and one search permitting different ordering of search terms, different conjugates of search terms, including plural and singular version of terms, etc. Search results from the two searches are combined into a single ordered list of search results by search interface module 116 with the weight input in textbox 228 specifying how much to weight the search results returned with the exact match requirement. For example, a weight of 0.7 would weight the search results returned with the exact match requirement by 0.7 and would weight the search results returned without the exact match requirement by 0.3 before combing the results together.

A content extraction engine may be specified in textbox 230. Textbox 232 allows the input of a "deep result max rank" (i.e., the maximum number of results from the same website that can be merged as a single result). Upon the input of the search settings, the search settings may be saved by selecting the save button 214.

Figure 9:
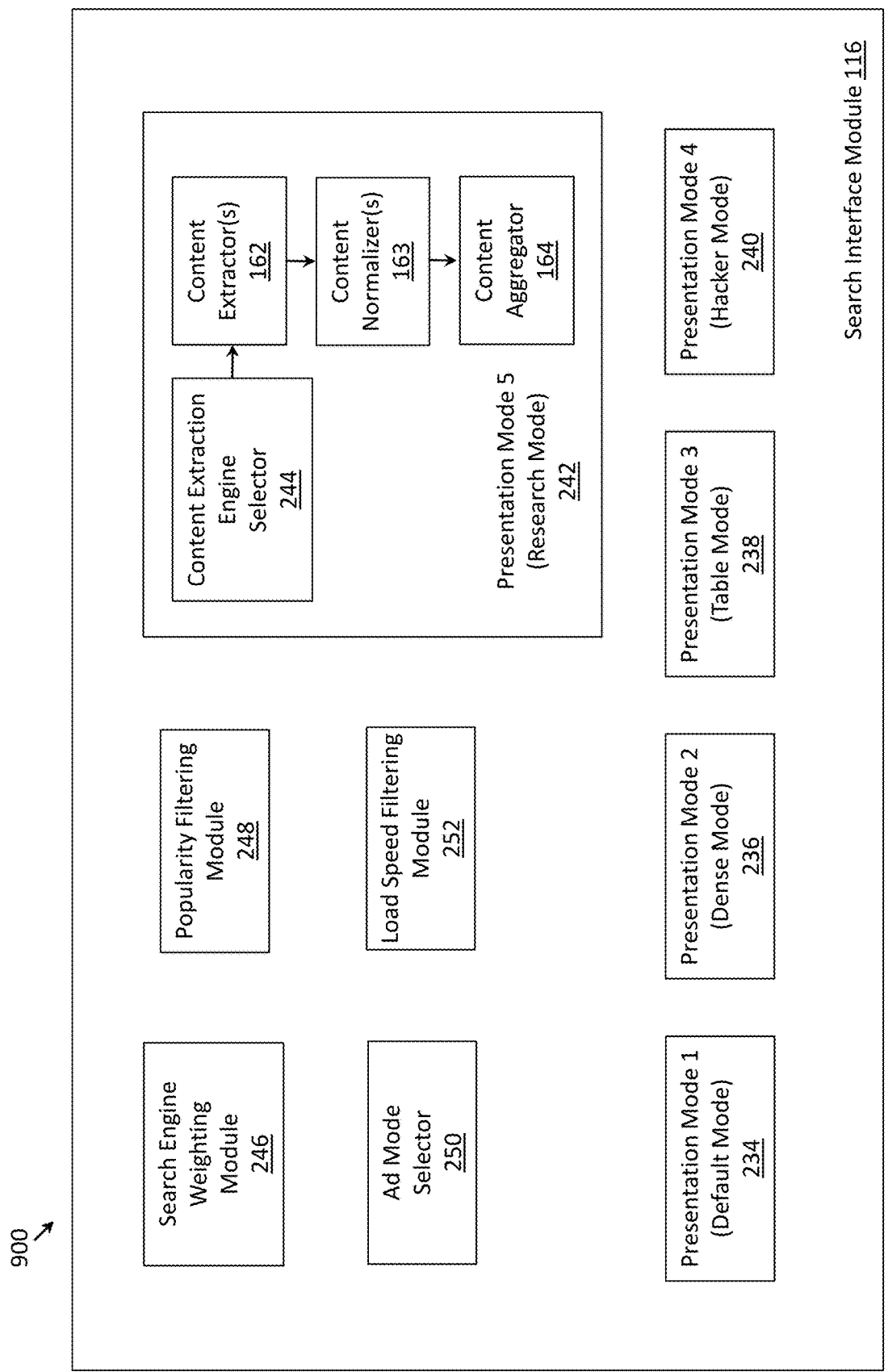
FIG. 9 depicts a block diagram of the search interface module, in accordance with one embodiment of the present invention.

FIG. 9 depicts block diagram 900 of the search interface module 116. Search interface module 116 may include a software module for providing the functionality of each of the presentation modes. Software module 234 may provide the first presentation mode; software module 236 may provide the second presentation mode; software module 238 may provide the third presentation mode; software module 240 may provide the fourth presentation mode; and software module 242 may provide the fifth presentation mode. Software module 242 may include one or more content extractors 162, one or more content normalizers 163 and content aggregator 164, such components previously described in FIGS. 6B and 6C. Software module 242 may also include content extraction engine selector 244, which configures the one or more content extractors 162 based on the user's selection received in text box 230.

Search interface module 116 may also include a search engine weighting module 246 which weights the respective search result rankings of search engines 108a-108c based on the user's weights provided in text boxes 226a-226c. Search interface module 116 may also include popularity filtering module 248 which filters the search results based on the user's selection in user interface element 191 of FIG. 7A or user interface element 206 in FIG. 8A. Search interface module 116 may also include an ad mode selector 250 which enables/disables the presentation of ads based on the user's selection in user interface element 192 of FIG. 7B or user interface element 210 in FIG. 8A. Search interface module 116 may also include a load speed filtering module 252 which filters the search results based on the user's selection of the minimum document load speed in user interface element 194 of FIG. 7C or user interface element 212 in FIG. 8A.

Figure 10:
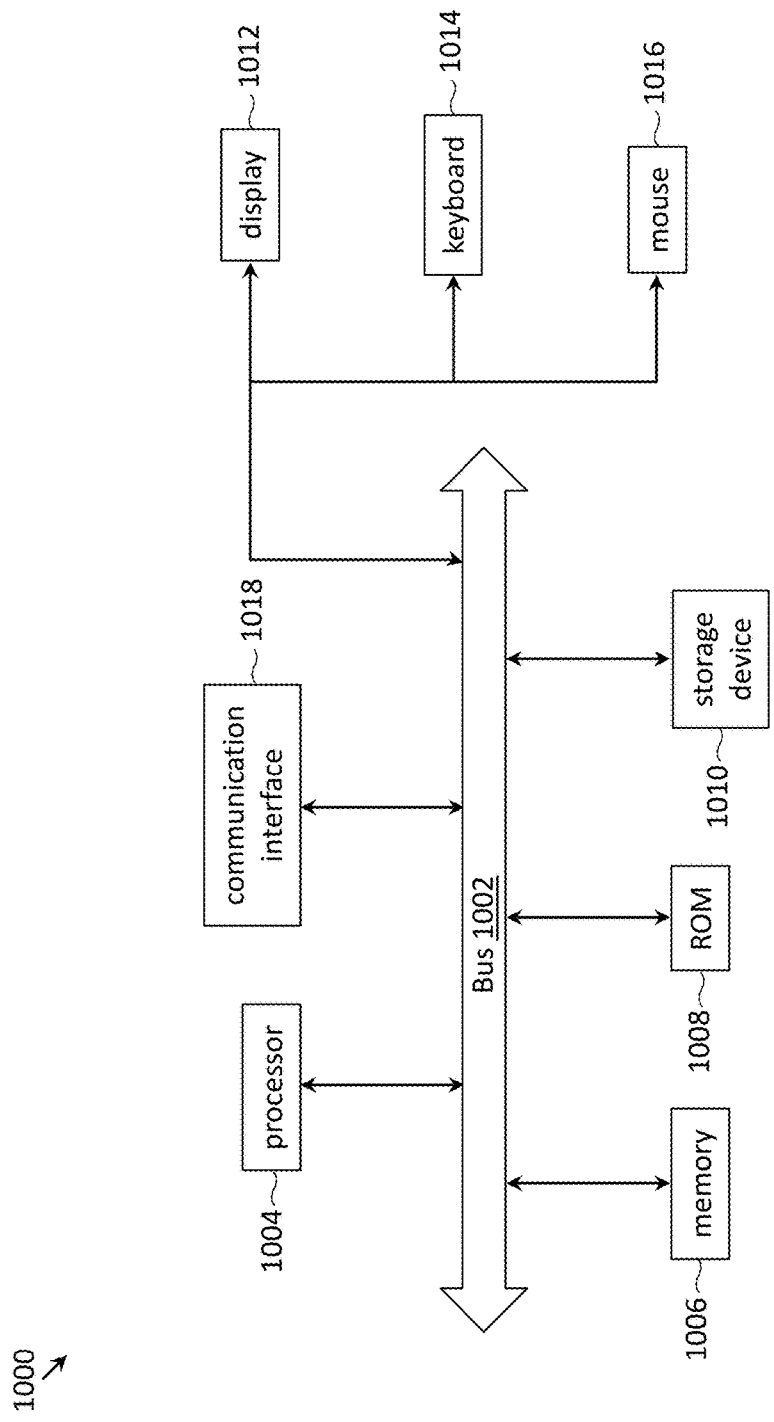
FIG. 10 depicts components of a computer system in which computer readable instructions instantiating the methods of the present invention may be stored and executed.

As is apparent from the foregoing discussion, aspects of the present invention involve the use of various computer systems and computer readable storage media having computer-readable instructions stored thereon. FIG. 10 provides an example of a system 1000 that may be representative of any of the computing systems (e.g., client device 102, search engines 108a-108c, search interface module 116, web server 110a-110c) discussed herein. Examples of system 1000 may include a smartphone, a desktop, a laptop, a mainframe computer, an embedded system, etc. Note, not all of the various computer systems have all of the features of system 1000. For example, certain ones of the computer systems discussed above may not include a display inasmuch as the display function may be provided by a client computer communicatively coupled to the computer system or a display function may be unnecessary. Such details are not critical to the present invention.

System 1000 includes a bus 1002 or other communication mechanism for communicating information, and a processor 1004 coupled with the bus 1002 for processing information. Computer system 1000 also includes a main memory 1006, such as a random access memory (RAM) or other dynamic storage device, coupled to the bus 1002 for storing information and instructions to be executed by processor 1004. Main memory 1006 also may be used for storing temporary variables or other intermediate information during execution of instructions to be executed by processor 1004. Computer system 1000 further includes a read only memory (ROM) 1008 or other static storage device coupled to the bus 1002 for storing static information and instructions for the processor 1004. A storage device 1010, for example a hard disk, flash memory-based storage medium, or other storage medium from which processor 1004 can read, is provided and coupled to the bus 1002 for storing information and instructions (e.g., operating systems, applications programs and the like).

Computer system 1000 may be coupled via the bus 1002 to a display 1012, such as a flat panel display, for displaying information to a computer user. An input device 1014, such as a keyboard including alphanumeric and other keys, may be coupled to the bus 1002 for communicating information and command selections to the processor 1004. Another type of user input device is cursor control device 1016, such as a mouse, a trackpad, or similar input device for communicating direction information and command selections to processor 1004 and for controlling cursor movement on the display 1012. Other user interface devices, such as microphones, speakers, etc. are not shown in detail but may be involved with the receipt of user input and/or presentation of output.

The processes referred to herein may be implemented by processor 1004 executing appropriate sequences of computer-readable instructions contained in main memory 1006. Such instructions may be read into main memory 1006 from another computer-readable medium, such as storage device 1010, and execution of the sequences of instructions contained in the main memory 1006 causes the processor 1004 to perform the associated actions. In alternative embodiments, hard-wired circuitry or firmware-controlled processing units may be used in place of or in combination with processor 1004 and its associated computer software instructions to implement the invention. The computer-readable instructions may be rendered in any computer language.

In general, all of the above process descriptions are meant to encompass any series of logical steps performed in a sequence to accomplish a given purpose, which is the hallmark of any computer-executable application. Unless specifically stated otherwise, it should be appreciated that throughout the description of the present invention, use of terms such as "processing", "computing", "calculating", "determining", "displaying", "receiving", "transmitting" or the like, refer to the action and processes of an appropriately programmed computer system, such as computer system 1000 or similar electronic computing device, that manipulates and transforms data represented as physical (electronic) quantities within its registers and memories into other data similarly represented as physical quantities within its memories or registers or other such information storage, transmission or display devices.

Computer system 1000 also includes a communication interface 1018 coupled to the bus 1002. Communication interface 1018 may provide a two-way data communication channel with a computer network, which provides connectivity to and among the various computer systems discussed above. For example, communication interface 1018 may be a local area network (LAN) card to provide a data communication connection to a compatible LAN, which itself is communicatively coupled to the Internet through one or more Internet service provider networks. The precise details of such communication paths are not critical to the present invention. What is important is that computer system 1000 can send and receive messages and data through the communication interface 1018 and in that way communicate with hosts accessible via the Internet. It is noted that the components of system 1000 may be located in a single device or located in a plurality of physically and/or geographically distributed devices.

Thus, a user interface for presenting search results has been described. It is to be understood that the above-description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A computer-implemented method, comprising:
   receiving, at a server, responses to a search query submitted to a plurality of search engines, the responses comprising search results;
   aggregating, by the server, the search results returned by the plurality of search engines into an ordered list of the search results according to weighted rankings of the search results, the weighted rankings derived from weightings applied to respective search results returned from different ones of the plurality of search engines;
   for a first subset of the ordered list of search results, extracting, by the server, contents from documents represented by the first subset of the search results;
   receiving a selection of a first search option, the first search option requesting that all documents associated with the search results do not contain advertisements, wherein responsive to such selection of the first search option, the extracting of contents from documents represented by the first subset of the search results includes extraction of information relevant to the search query and excludes extraction of advertisements; and
   prior to any selection of the search results by a user at a client device: (i) aggregating, by the server, the contents extracted from the documents represented by the first subset of the search results into a first aggregation such that within the first aggregation an ordering of the extracted contents in the first aggregation is consistent with the ordered list of search results and respective ones of the contents extracted from the documents represented by the first subset of the search results are scrollable from one to another when the first aggregation is displayed at the client device; and (ii) subsequent to forming the first aggregation at the server, transmitting said first subset of the search results and the first aggregation to the client device along with instructions to (x) cause the client device to simultaneously display at least a portion of the first subset of the search results in a first scrollable region of a display with a first one of the search results displayed in an emphasized manner in the first scrollable region and at least a first portion of the first aggregation in a second scrollable region of the display; and (y) responsive to a user scrolling from the first portion of the first aggregation to a second portion of the first aggregation in the second scrollable region, update the display of the first one of the search results from the emphasized manner to a de-emphasized manner in the first scrollable region and display a second one of the search results corresponding to the second portion of the first aggregation in an emphasized manner in the first scrollable region, wherein the first and second portions of the first aggregation are displayed with domain name links inserted therein, the domain name links corresponding to respective ones of the documents represented by the first subset of the search results from which the first and second portions of the first aggregation were extracted.

2. The computer-implemented method of claim 1, wherein contents extracted from the documents associated with the first subset of the search results are normalized, by the server, before the contents are aggregated into the first aggregation.

3. The computer-implemented method of claim 1, further comprising:
   retrieving, at the server, contents extracted from documents represented by a second subset of the search results, the second subset of the search results being disjoint from the first subset of the search results;
   aggregating, by the server, the contents extracted from the documents represented by the second subset of the search results into a second aggregation; and
   transmitting the second aggregation to the client device for simultaneous display of at least a portion of the second subset of the search results and at least a portion of the second aggregation at the client device.

4. The computer-implemented method of claim 1, further comprising:
   receiving a selection of a search option, the search option requesting that all documents associated with the search results have a load speed above a certain threshold.

5. The computer-implemented method of claim 1, further comprising:
   receiving a selection of a second search option, the second search option requesting that all documents associated with the search results have a load speed above a certain threshold.

* * * * *